United States Patent [19]
Nagy et al.

[11] 3,809,002
[45] *May 7, 1974

[54] AUTOMATIC COUPLING MECHANISM FOR SUBMARINES DIRIGIBLES AND OTHER LIKE BUOYANT VEHICLES

[76] Inventors: Charles E. Nagy, 3221 Bend Pl., Hollywood, Calif. 90068; John F. Nagy, 785 W. End Ave., New York, N.Y. 10025

[*] Notice: The portion of the term of this patent subsequent to May 20, 1989, has been disclaimed.

[22] Filed: May 31, 1972

[21] Appl. No.: 258,350

[52] U.S. Cl. .............. 114/235 B, 213/1.3, 213/75, 244/1 SD, 114/16 R
[51] Int. Cl. ...... B63b 21/56, B61g 5/06, B64c 7/00
[58] Field of Search ........ 114/235 A, 235 B, 235 R, 114/74 T, 16 R; 294/83 AB, 83 R, 78 R, 78 A, 86 R; 244/1 SD, 1 SS, 3, 118, 135 A, 137; 287/87; 213/75, 76, 1.3, 212; 105/3, 4; 280/408, 411, 204, 292

[56] References Cited
UNITED STATES PATENTS
3,478,711  11/1969  Comds .......................... 114/235 B
3,666,216  5/1972  Nagy et al. ..................... 244/137

Primary Examiner—Trygve M. Blix
Assistant Examiner—Charles E. Frankfort
Attorney, Agent, or Firm—Laforest S. Saulsbury, Esq.

[57] ABSTRACT
This is a coupling mechanism for use in connecting together submarines, dirigible aircraft and other similar vehicles in a manner that cannot be readily effected by hand within water or in the air. These coupling mechanisms are automatic in operation and once the submarine or dirigible has made firm and true axial contact with a tow vehicle the ball mechanism will be automatically put into operation to extend the ball so as to engage a sensor plunger in the ball grip mechanism and thereby effect the operation of the mechanism to enclose the ball grip clamps about the ball head of the trailing vehicle to thereby finally effect the coupling of the vehicles, one with the other. At the same time that the mechanical coupling of the mechanisms is effected an electric coupling of a plug within a socket is made between the mechanisms so that electric current can be passed from the two submarine to the trailer submarine for the purposes of charging its battery and providing current directly from the generator of the tow submarine for various uses in the trailer craft. Adequate provision is provided in the ball head mechanism to take up any shock from the ball head when it is extended engaging with a wall obstruction in such a manner that would normally cause damage and so that the blow can be cushioned within the ball mechanism by the action of cushioning springs and by hydraulic dampening of the return of the ball to its extended position when the obstruction is removed and wherein automatic retraction of the ball should be effected should the obstruction not be removed. The same ball grips mechanisms operable in the same manner in response to engagement of a ball with a sensing pin can also, as shown, be used in the ground for mooring purposes of a dirigible. The finding and the joining of the coupling parts being effected through radio.

10 Claims, 39 Drawing Figures

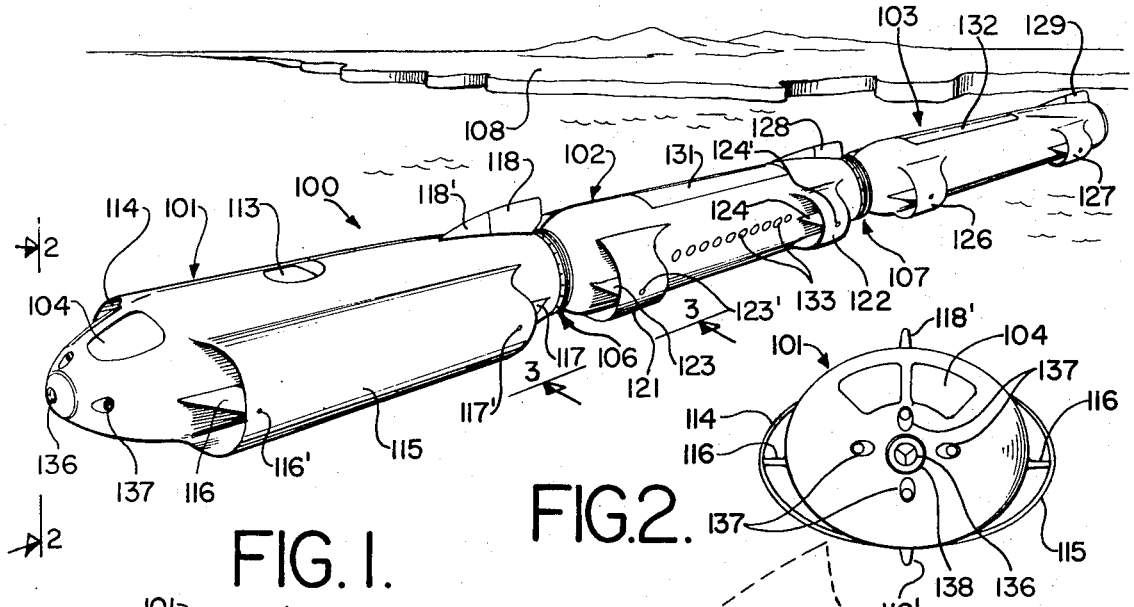
FIG. 1.
FIG. 2.
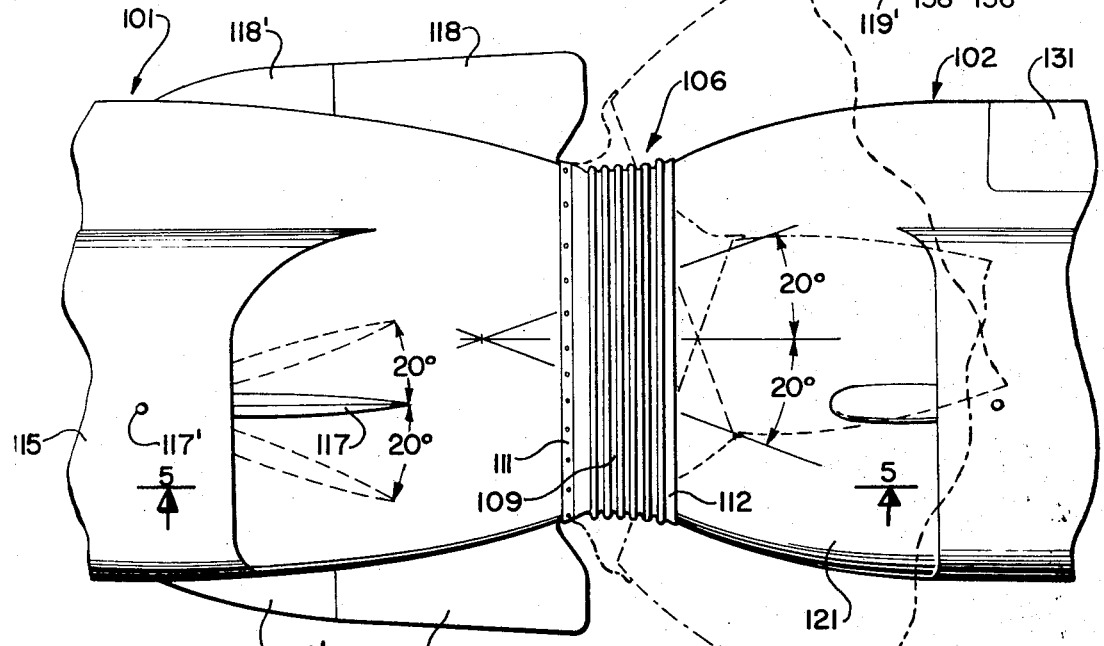
FIG. 3.
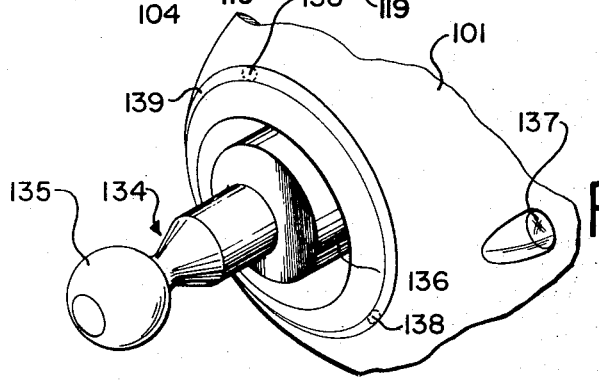
FIG. 4.

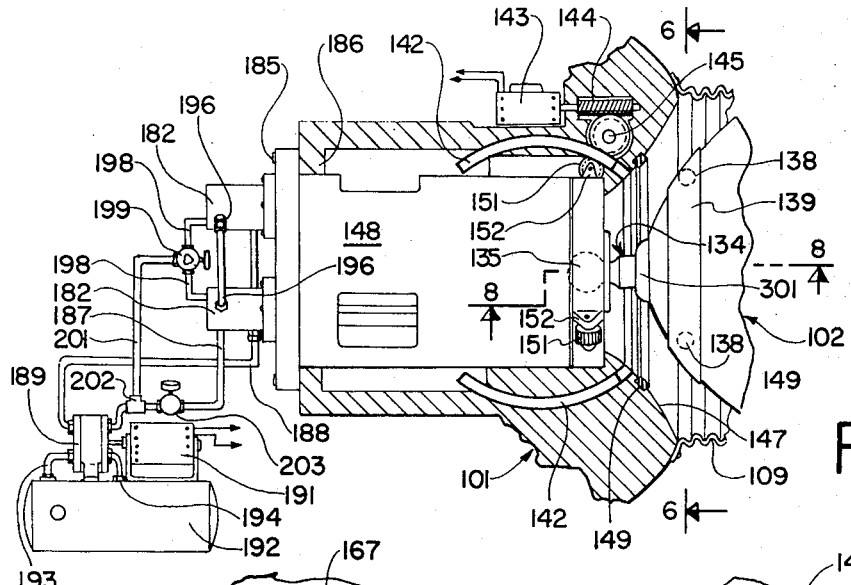
FIG.5.
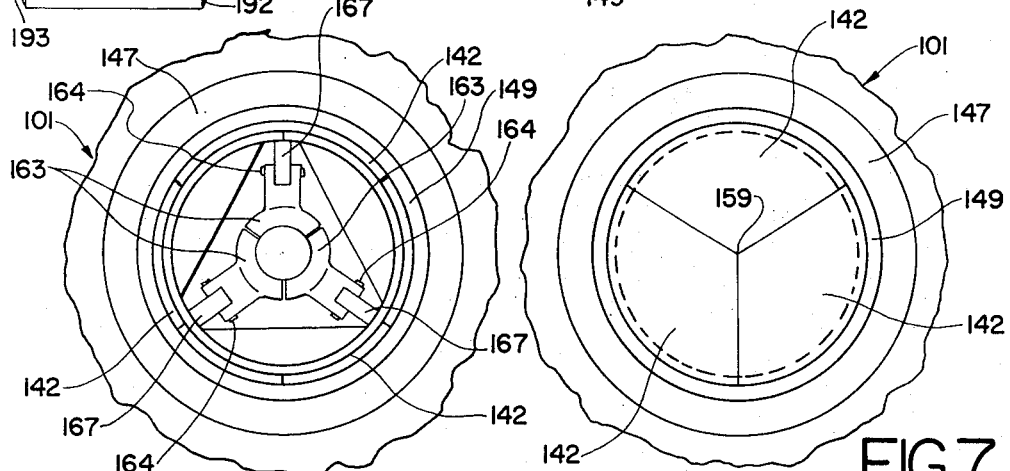
FIG.6.
FIG.7.
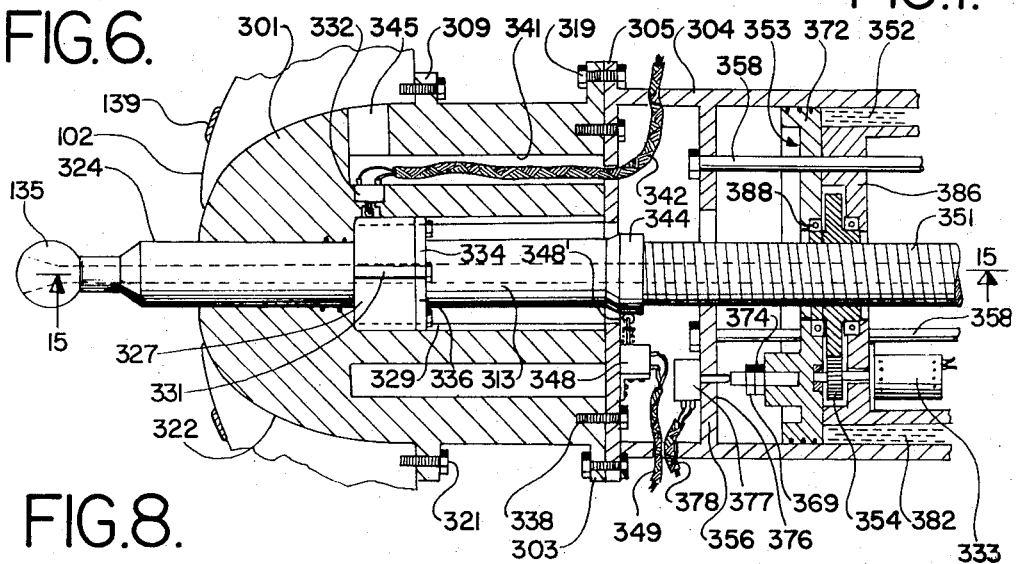
FIG.8.

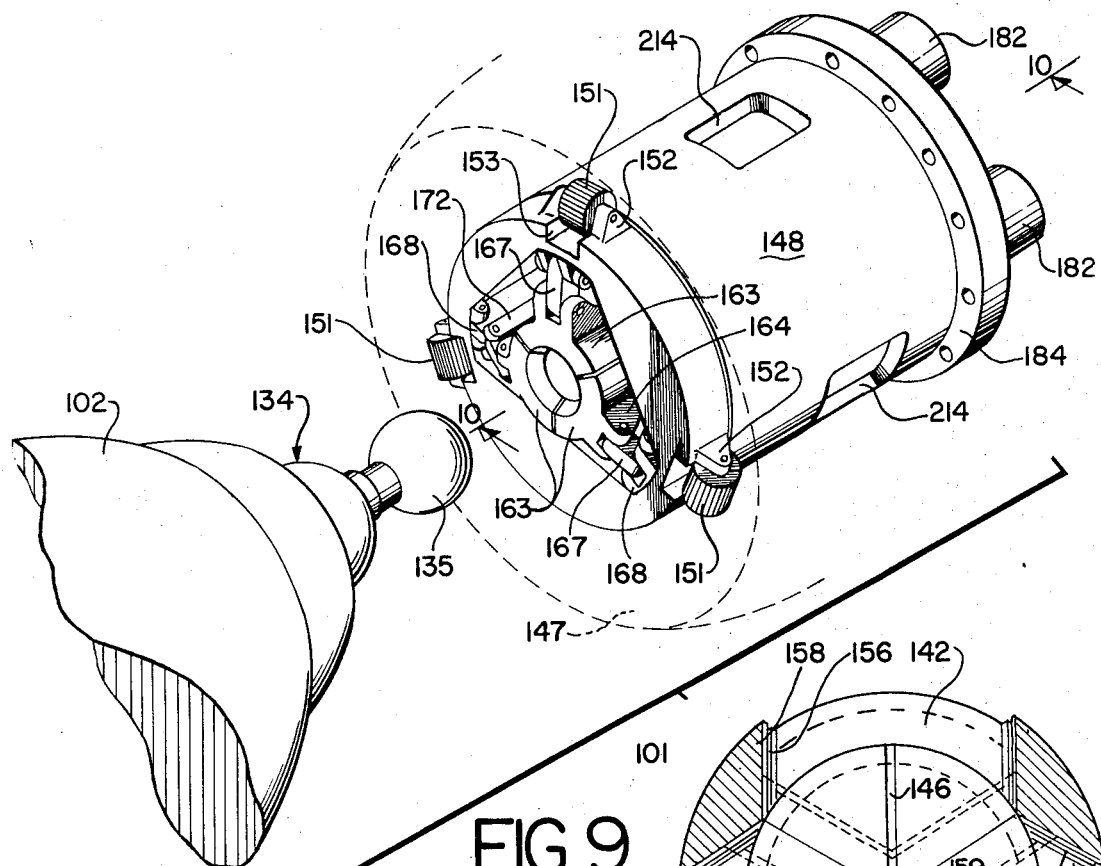
FIG. 9
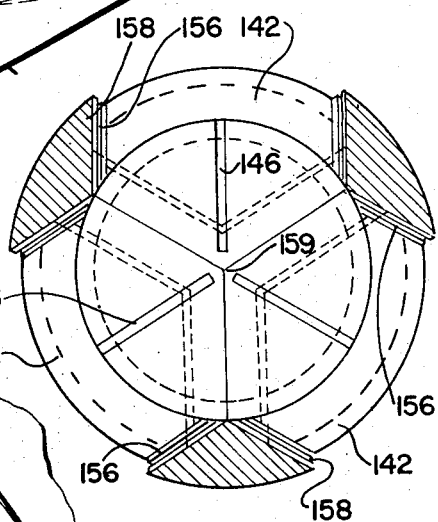
FIG. 14.
FIG. 12.
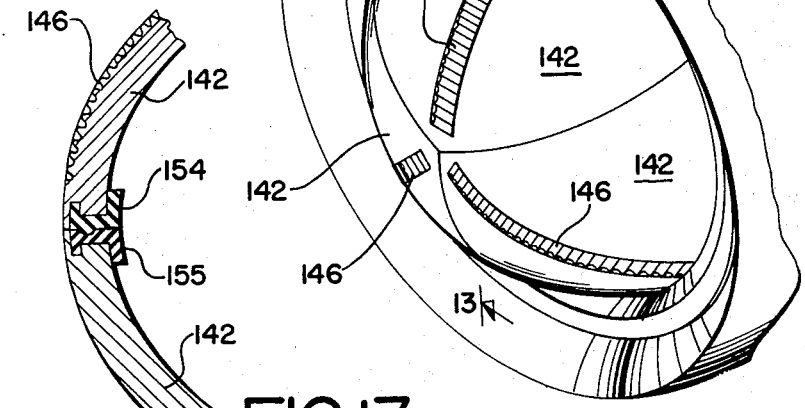
FIG. 13.

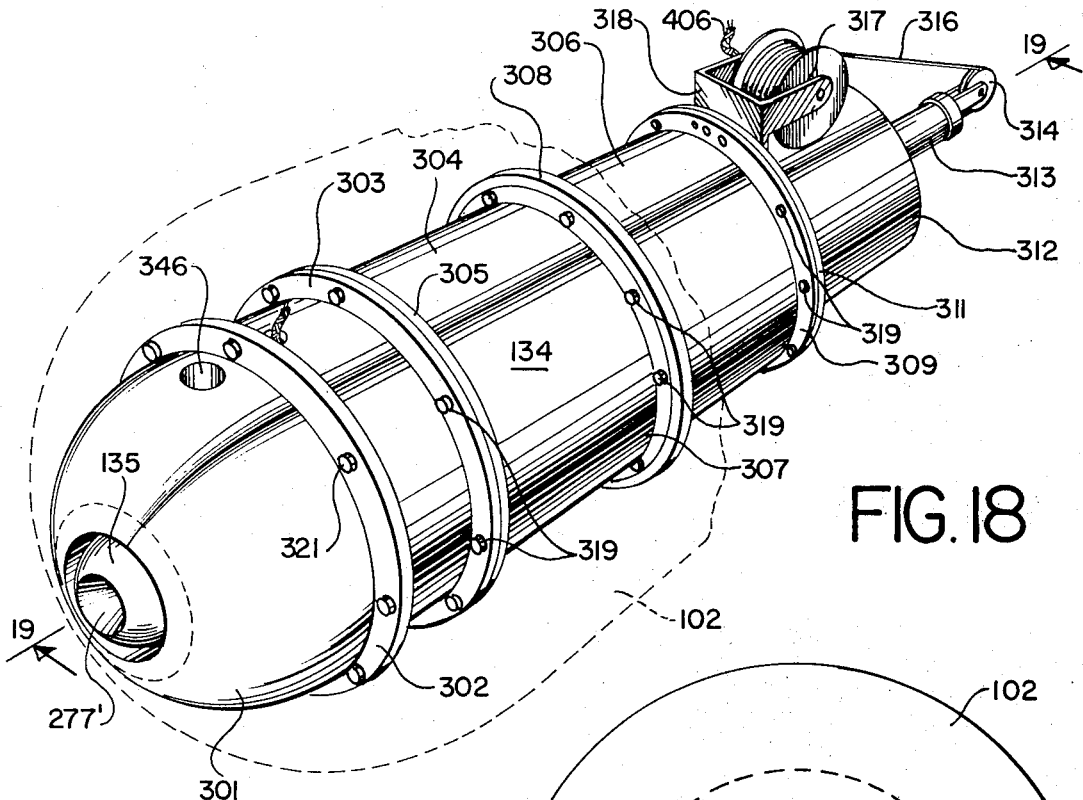
FIG. 18
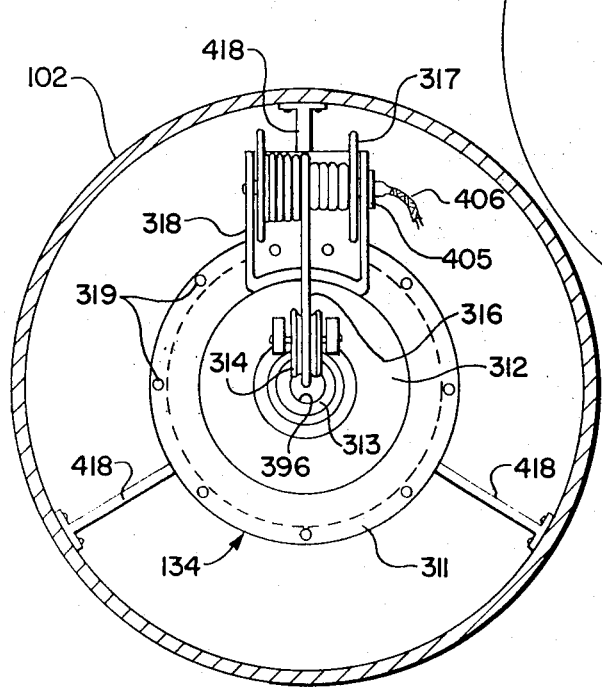
FIG. 21.
FIG. 28

AUTOMATIC COUPLING MECHANISM FOR SUBMARINES DIRIGIBLES AND OTHER LIKE BUOYANT VEHICLES

This invention is an improvement on our previous U.S. Pat. No. 3,666,216, patented May 30, 1972 for a THEFT PROOF SELF CONNECTING LOCK COUPLING DEVICE FOR HELICOPTERS AND TOW SUBMARINES.

This invention relates to automatic coupling devices for submarines, dirigibles and like vehicles in buoyant waters or air.

It is a principal object of the present invention to provide a coupling device for use in connection with submarines and like vehicles which will be automatic in operation upon the nosing of a trailer submarine or vehicle into the trailing end of a submarine and the mechanism put into operation thereby by engagement with a sensor plunger of the ball gripping mechanism.

It is another object of the invention to provide in an automatic coupling of submarines and the like, for the automatic coupling of an electric plug in one of the coupling mechanisms with a corresponding electric receptacle of the other mechanisms so that electric current and control circuits can be transmitted between the vehicles either for the charging of batteries or for purposes of control or communication.

It is still another object of the invention to provide an automatic coupling mechanism for submarines and the like with adequate means provided for a ball extending mechanism unit for absorbing shock transmitted through the extended ball upon the submarine running the ball into a wall obstruction and to thereby minimize the breakage of parts and there is provided in association therewith automatic means for retracting the ball head upon the obstruction being encountered.

It is a further object of the invention to provide a ball grip mechanism unit for use with submarines, dirigibles and similar flotation vehicles that may also be used as a mooring device installed in the ground and adapted to receive a ball extended by a cable from a craft floating thereabove and particularly such a mechanism that can be worked by radio homing apparatus and easily found thereby.

It is still another object of the invention to provide mechanism for use in connection with submarines and dirigibles for the connecting of the same together in which these mechanisms are self contained and are mountable as a unit into the ends of the submarines or dirigibles and with all of the actuating devices being provided in a single housing.

For a better understanding of the invention, reference may be had to the following detailed description taken in connection with the accompanying drawings, in which:

FIG. 1 is a perspective view of a tractor or tow submarine with trailer or tanker submarines connected together and to the tow submarine by the automatic coupling mechanism of the present invention, the submarine train being adapted to move under arctic ice.

FIG. 2 is a front elevational view of the tractor submarine as viewed on line 2—2 of FIG. 1.

FIG. 3 is a fragmentary elevational view looking upon the tail end of a tow submarine and the nose end of a trailer submarine at their point of connection with one another and as viewed generally on line 3—3 of FIG. 1, with illustration being shown as to the manner in which the trailer submarine can angle relative to the tow submarine and a collapsible accordion-like sheath carried on the docking cone of one submarine and overlying the nose of the trailing submarine to overlie the hitch connection and yet permit the angular movement of the one submarine relative to the other.

FIG. 4 is a fragmentary perspective view of the tow ball piston extended from the nose of a submarine and free of the advance submarine.

FIG. 5 is a fragmentary longitudinal sectional view of the docking cone closed upon the ball and the submarines joined with one another and looking in elevation upon the ball piston clamp unit mounted in the tail end of the tow submarine and of the air compressor system used therewith, this view being taken generally on line 5—5 of FIG. 3.

FIG. 6 is a rear elevational view of the tail end of the tow submarine and upon the ball grip clamps of the ball grip mechanism unit, and of the shutter like door in the open position, the view being taken on line 6—6 of FIG. 5.

FIG. 7 is a similar end view of the tail end of the tow submarine and of the doors in their closed positions.

FIG. 8 is a fragmentary longitudinal sectional view of the two ball mechanism unit and looking in section as viewed generally along line 8—8 of FIG. 5, and in particular upon the shock absorbing assembly thereof.

FIG. 9 is a collective perspective view of a fragment of the ball mechanism and upon the self contained grip clamp mechanism axially aligned therewith.

Figure 10:
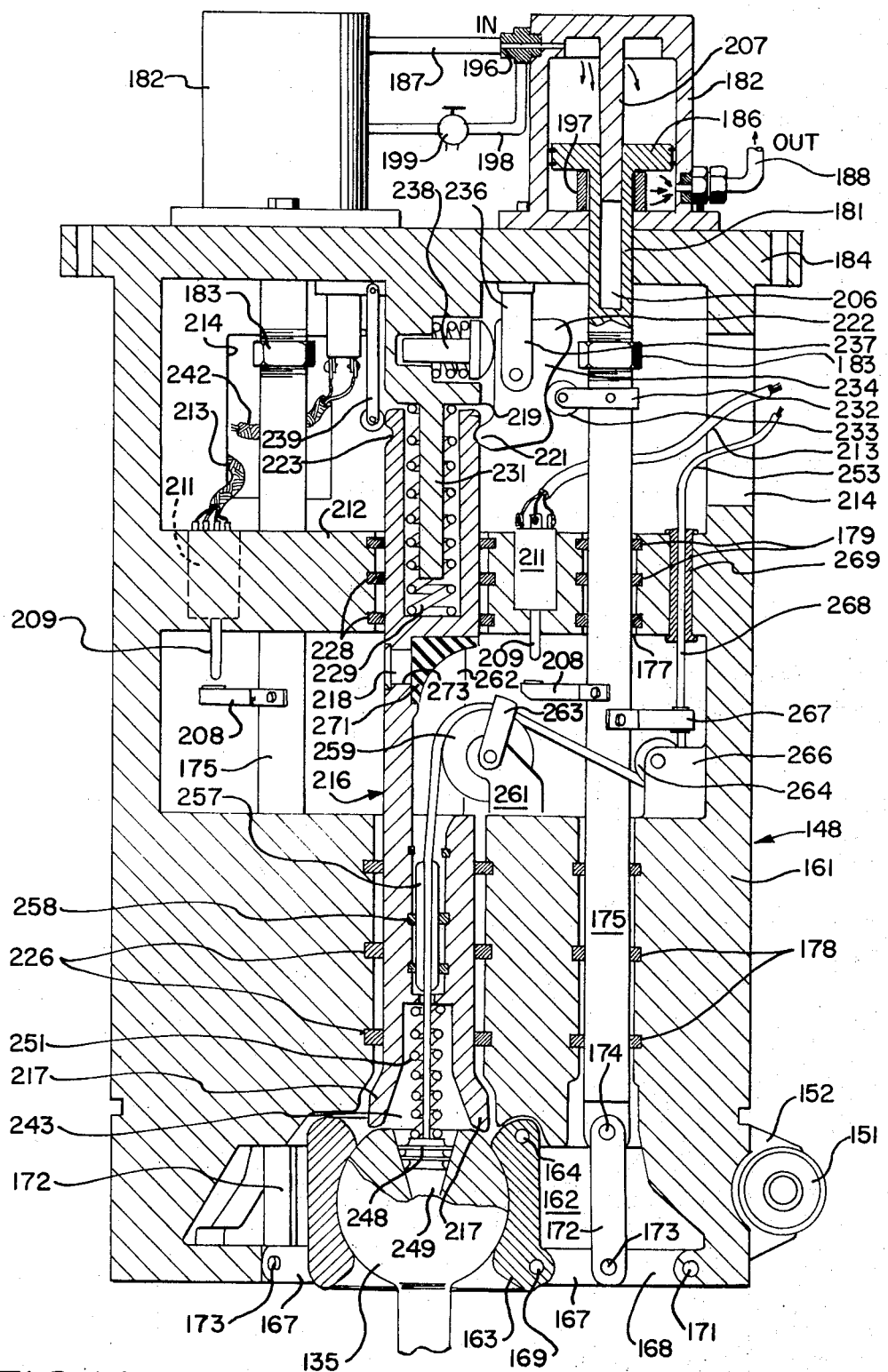

FIG. 10 is an enlarged sectional view of the ball grip mechanism unit as viewed generally on line 10—10 thereof with the ball grip clamps in engagement with the ball as when the connection is effected between the submarines, showing the position of the parts at this time.

Figure 11:
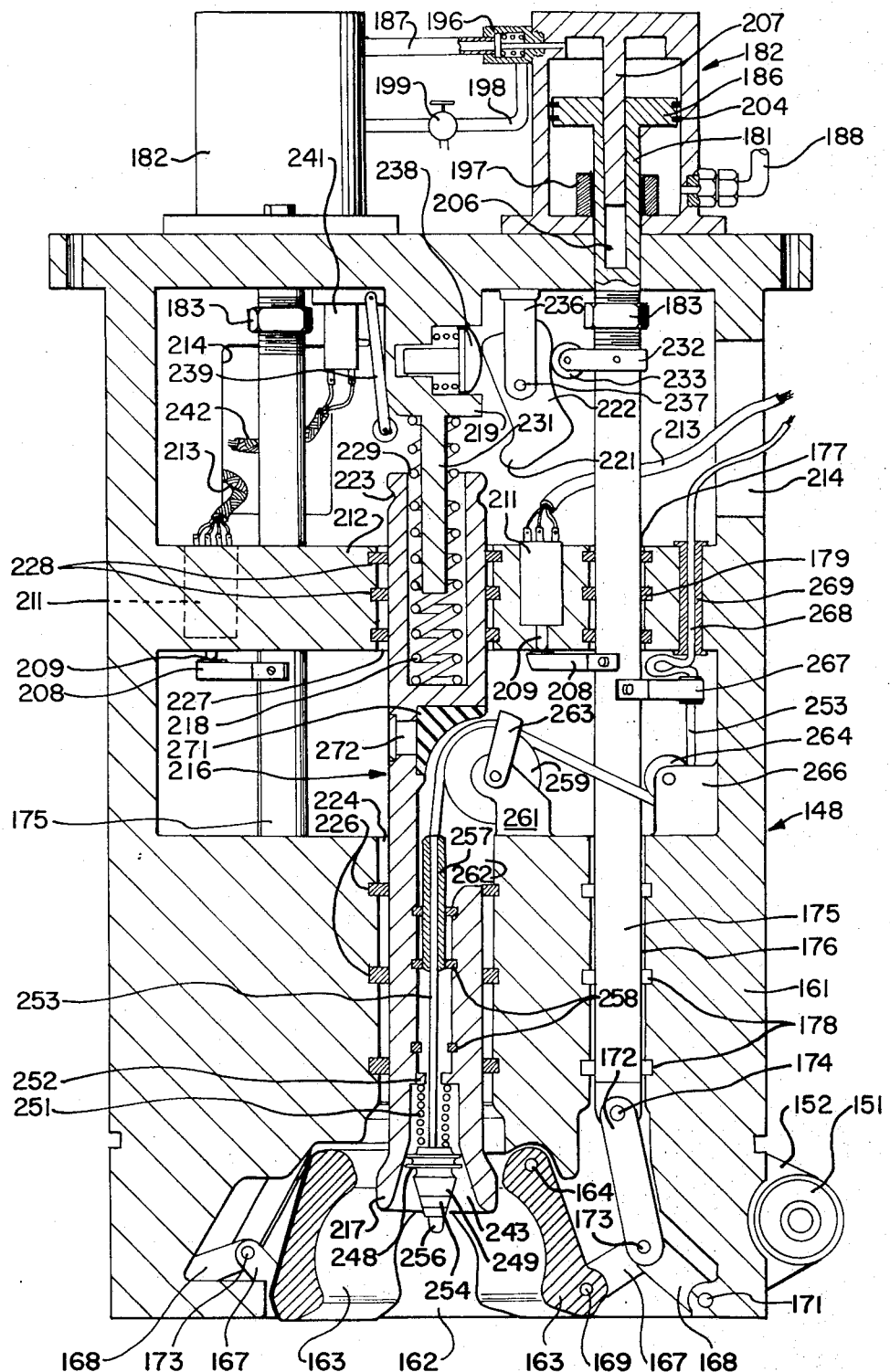

FIG. 11 is a similar longitudinal sectional view of the ball grip mechanism showing the position of the parts thereof upon the ball having been released from this ball grip unit.

FIG. 12 is a fragmentary perspective view of the nose of the submarine and looking upon the front faces of the doors in their closed position.

FIG. 13 is a fragmentary sectional view taken through the joined doors on line 13—13 of FIG. 12.

FIG. 14 is an elevational view of the docking end of the submarine and looking upon the guiding slots for the shutter-like doors through which the doors are moved between their closed and open positions.

Figure 15:
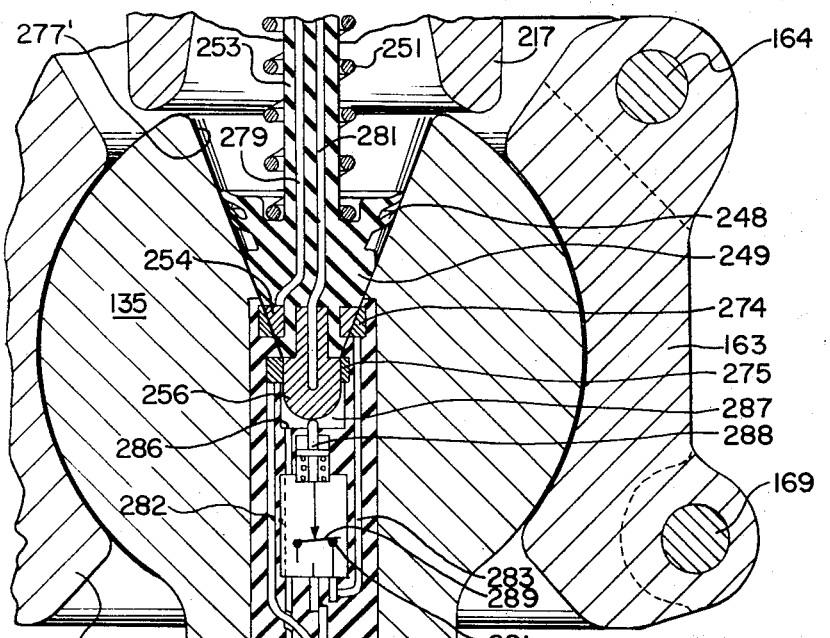

FIG. 15 is an enlarged collective and fragmentary sectional view of the tow ball and of the harpoon or stabber like switch plug extending in the tow ball socket from the sensor sleeve with the ball being engaged by the ball grip clamps, the view being taken generally of the tow-ball on line 15—15 of FIG. 8.

Figure 16:
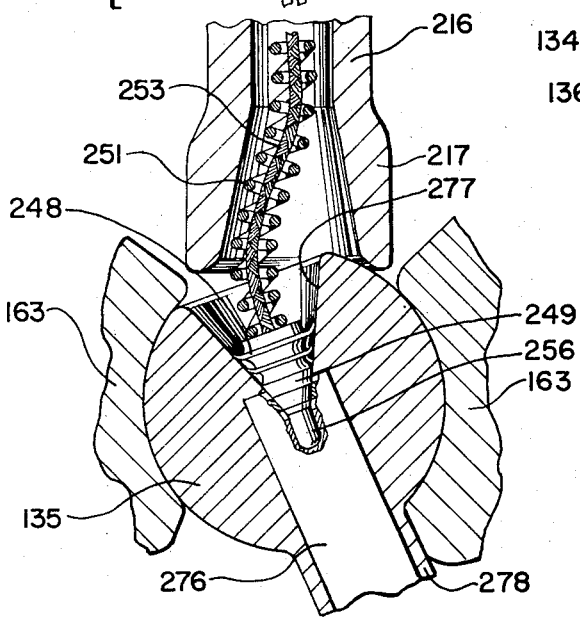

FIG. 16 is an enlarged sectional view similar to FIG. 15 with illustration being made as to the manner in which the plug switch cable and the spring surrounding the same may be bent to be accommodated when the submarines are angled relative to one another.

Figure 17:
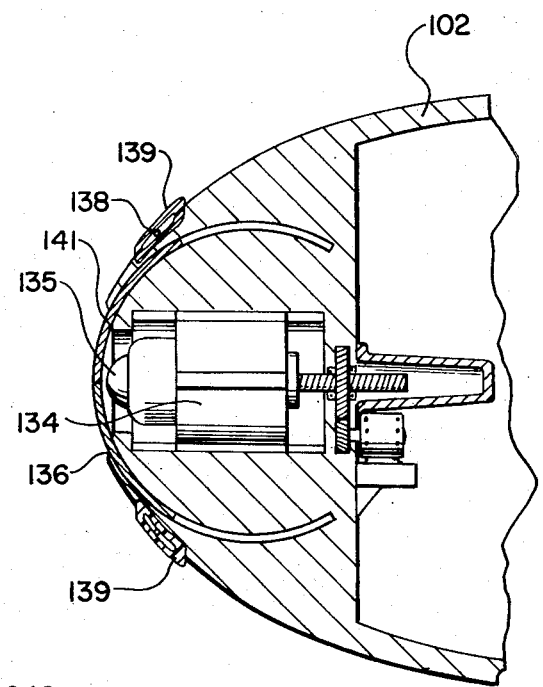

FIG. 17 is a fragmentary longitudinal sectional view of the tow-ball mechanism unit mounted in the nose cone portion of the submarine, the ball being retracted and the outer doors closed and with switch operating parts on the surface of the nose cone for engagement with funnel shaped surface of the docking end of the submarine and operable to effect automatic coupling of the mechanisms with one another and the submarines together.

FIG. 18 is a perspective view of the tow-ball mechanism unit removed from the nose of the submarine with the ball retracted and the cable guide and reel at the rear end thereof.

Figure 19:
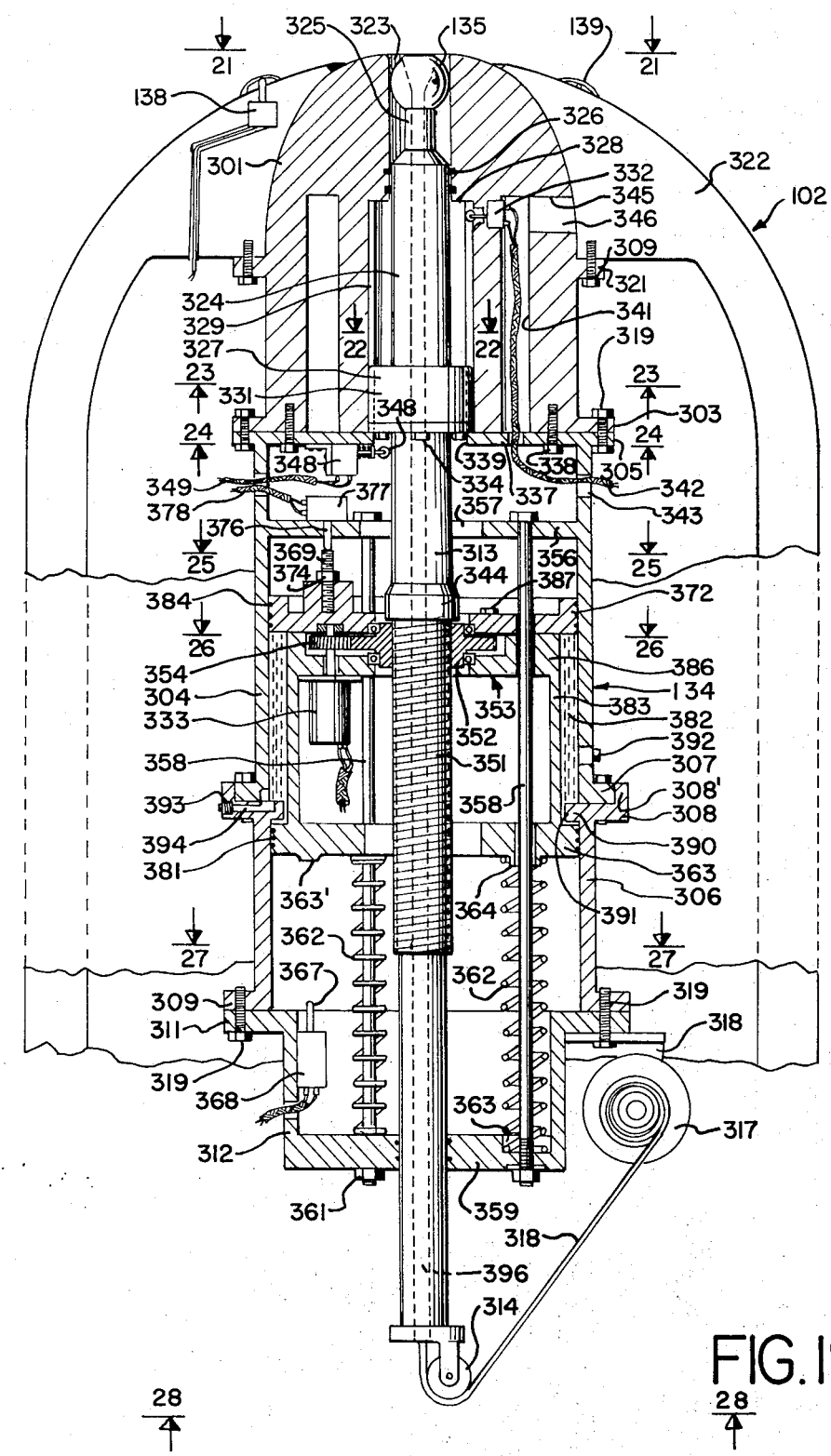

FIG. 19 is a fragmentary longitudinal sectional view of the tow ball mechanism unit as viewed on line 19—19 of FIG. 18 showing the position of the parts when the tow ball is retracted.

Figure 20:
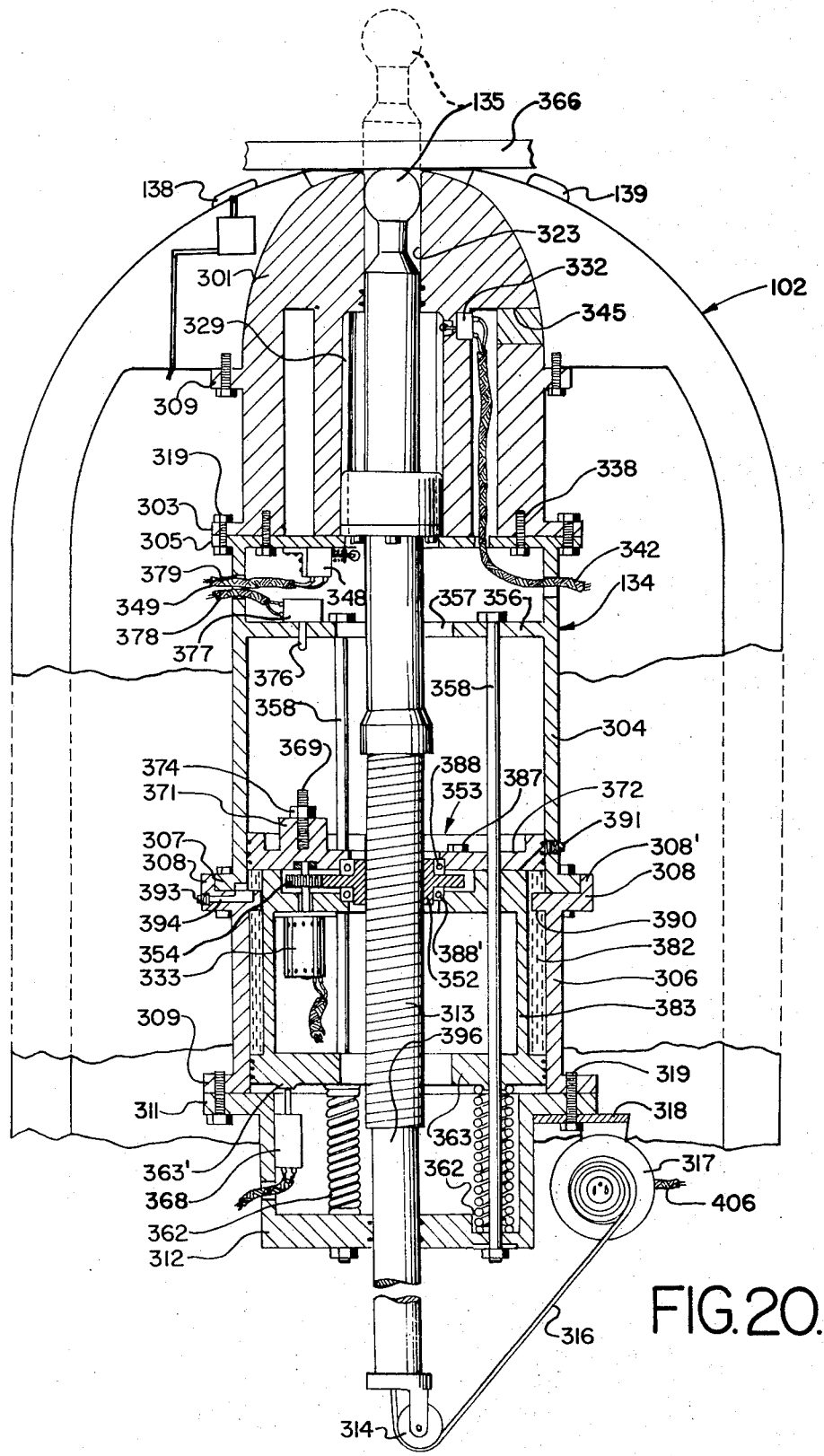
Figure 22:
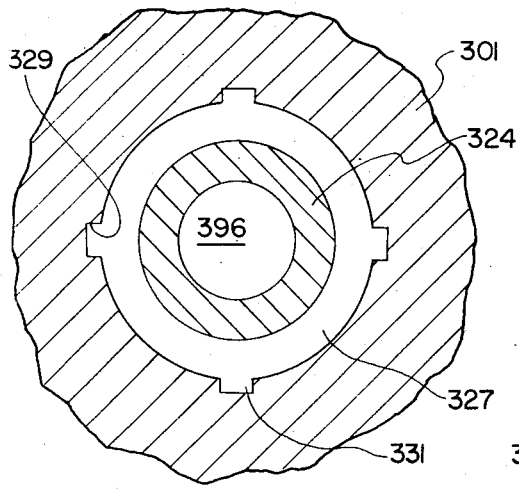
Figure 23:
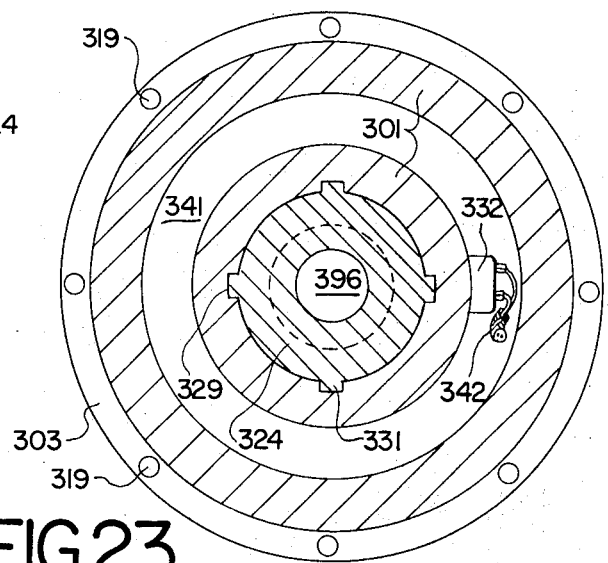
Figure 24:
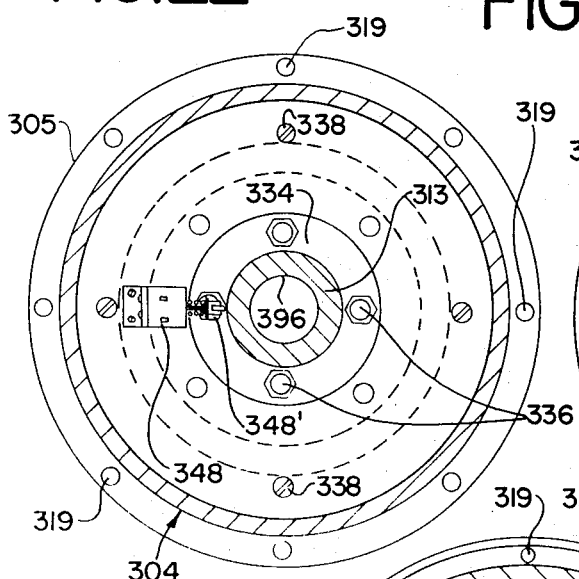
Figure 25:
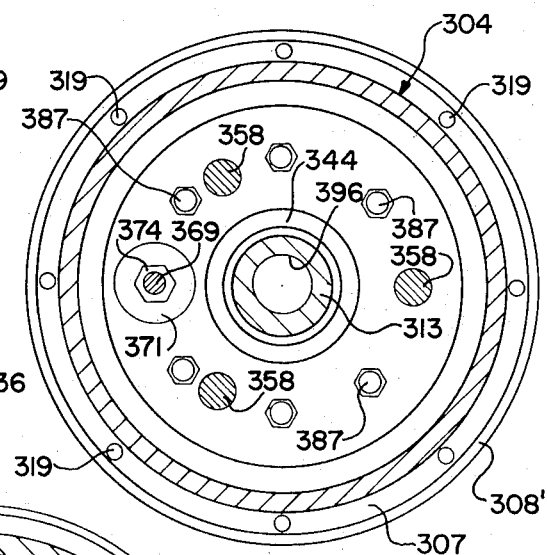
Figure 26:
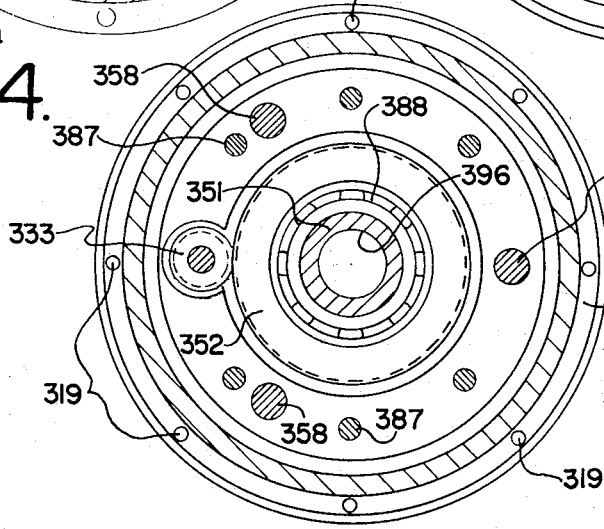

FIG. 20 is a similar longitudinal sectional view of the tow ball mechanism unit showing the relative positions of the parts when the tow ball has been projected.

FIG. 21 is a front elevational view of the tow ball and the conical nose end of the submarine as viewed generally on line 21—21 of FIG. 19.

FIGS. 22, 23, 24, 25, 26, and 27 are respectively transverse sectional views of the tow ball mechanism unit as viewed respectively upon lines 22—22, 23—23, 24—24, 25—25, 26—26, and 27—27 of FIG. 19.

FIG. 28 is a transverse sectional view taken across the submarine and looking in elevation upon the rear end of the two ball mechanism unit and the cable guide and reel mounted thereon.

Figure 27:
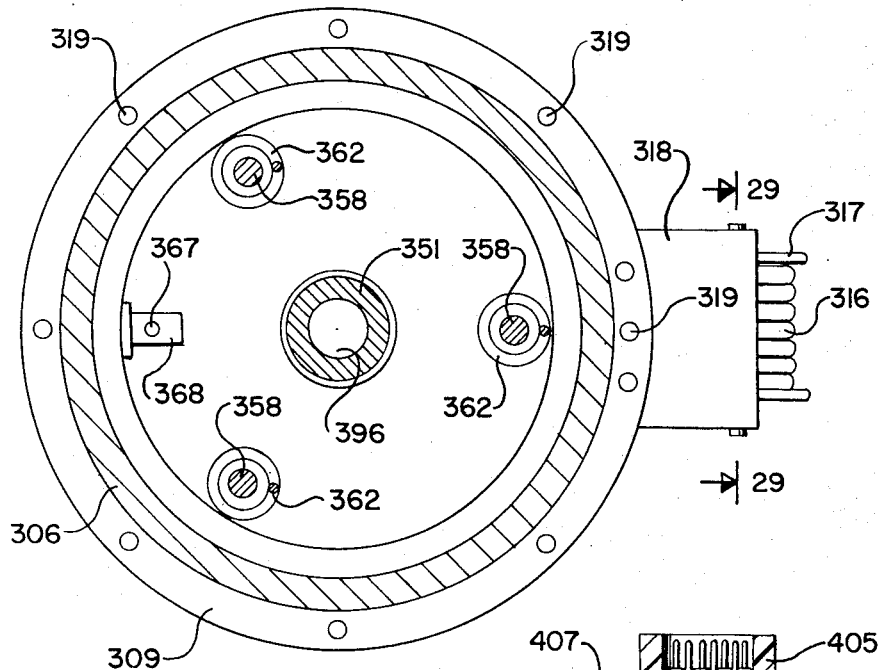
Figures 29, 30:
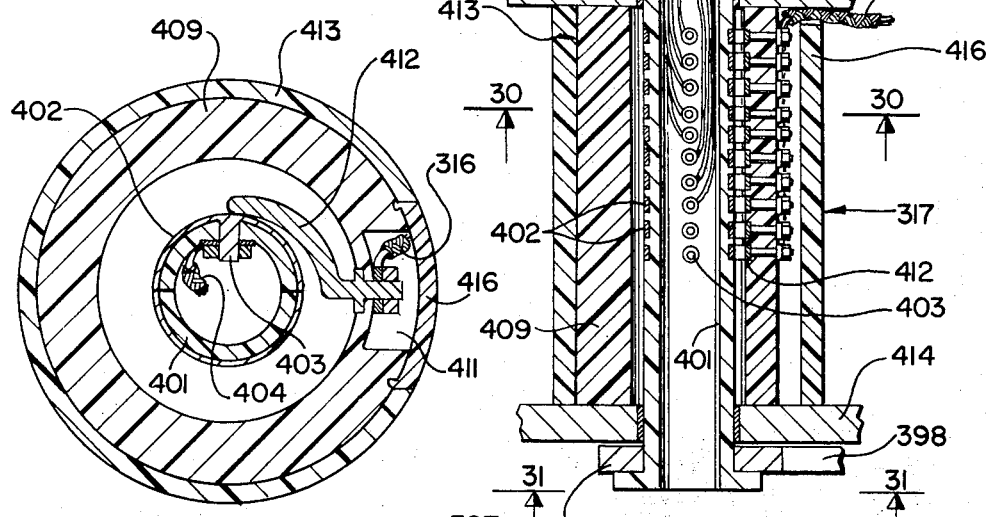

FIG. 29 is a longitudinal sectional view of the cable reel showing the switch connections therein with wire terminals and a detachable bin receptacle, the view being taken generally on line 29—29 of FIG. 27.

FIG. 30 is an enlarged transverse sectional view taken on line 30—30 of FIG. 29 and looking upon one of the switch contact cam and ring assemblies.

Figure 31:
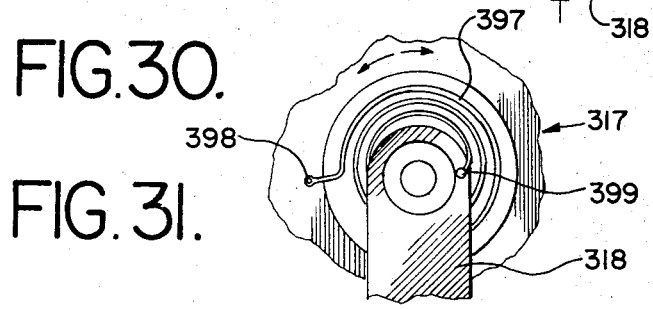

FIG. 31 is a fragmentary end view of the cable reel assembly showing a cable return spring connected between the reel and its supporting arm, the view being taken generally on line 31—31 of FIG. 29.

Figures 32, 33, 34:
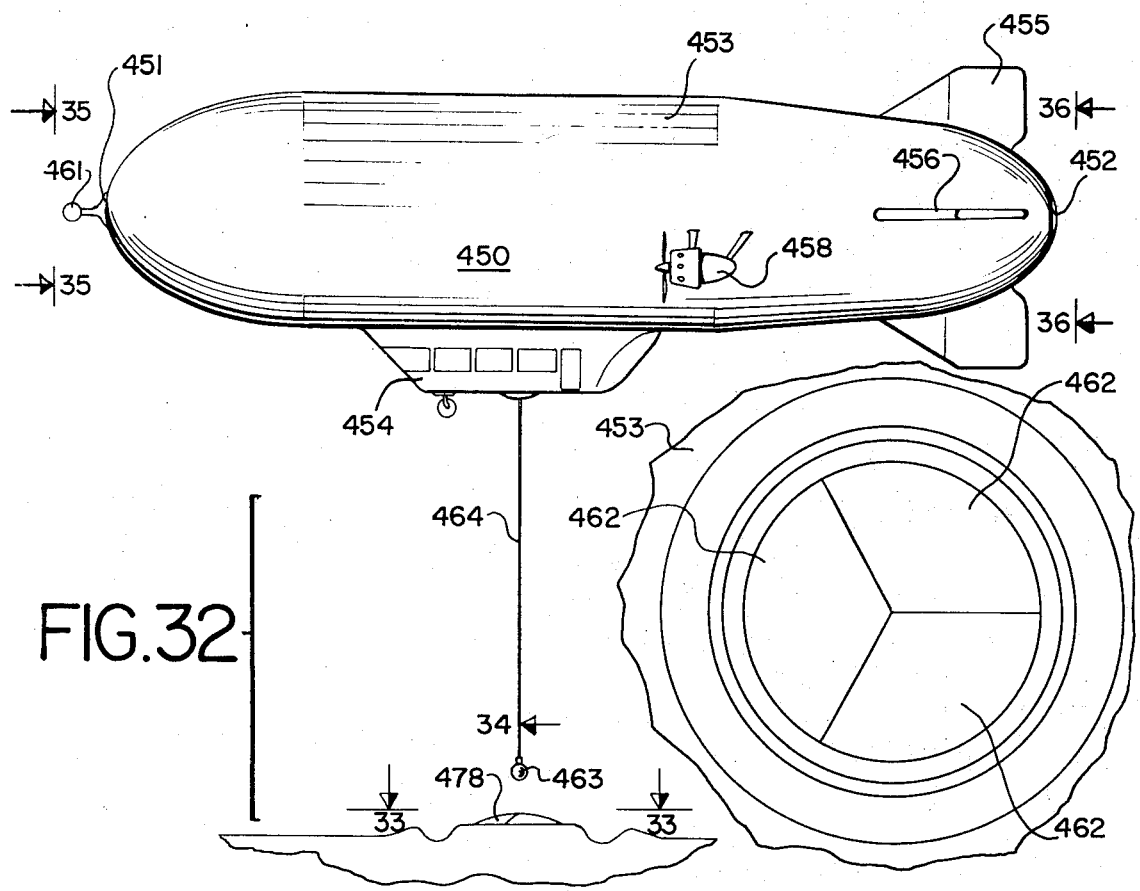

FIG. 32 is a side elevational view of a dirigible with a ball suspended therefrom and adapted to be engageable with a grip clamp unit carried in a well in the ground with closure doors for connection with the ball grip clamp mechanism of the general construction of the submarine ball grip mechanism adapted to receive the ball suspended from the dirigible to effect mooring of the dirigible with the ground ball grip clamp mechanism.

FIG. 33 is an enlarged top plan view looking upon the closed ground ball grip clamp mechanism.

FIG. 34 is an enlarged sectional view of the suspended ball from the dirigible about to enter the ground ball grip clamp mechanism, the section being generally taken on line 34—34 of FIG. 32.

Figure 35:
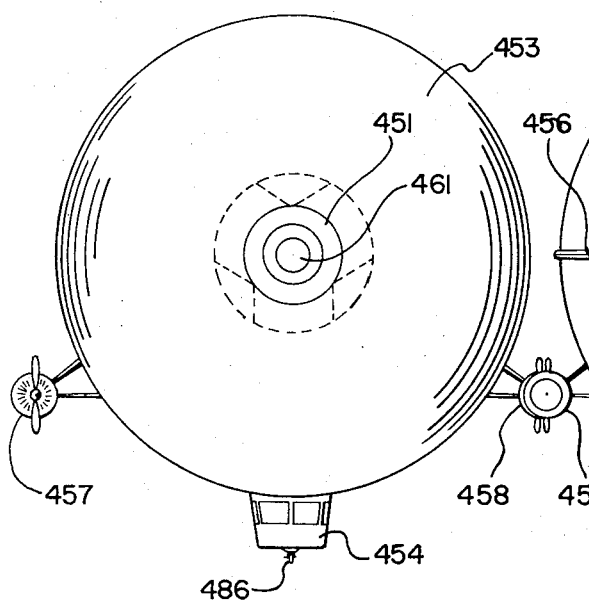

FIG. 35 is a front end view of the dirigible looking on line 35—35 of FIG. 32 and the tow mechanism extended therefrom.

Figure 36:
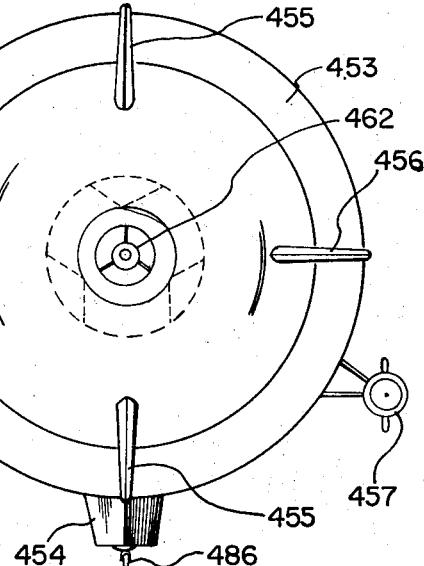

FIG. 36 is a rear end elevational view of the dirigible looking upon line 36—36 thereof and upon a closed opening in which there is mounted a tow ball grip clamp mechanism unit of a type such as shown for use with submarines.

Figure 37:
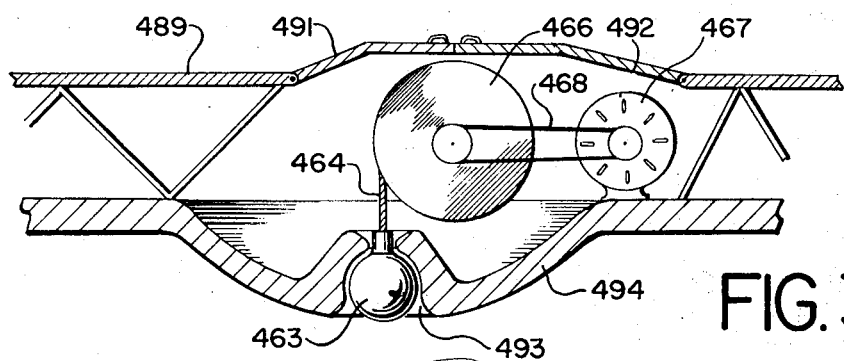

FIG. 37 is a fragmentary sectional view taken through the floor of the cabin showing the mooring ball retracted into the bottom of the dirigible cabin by its motor operated winch.

Figure 38:
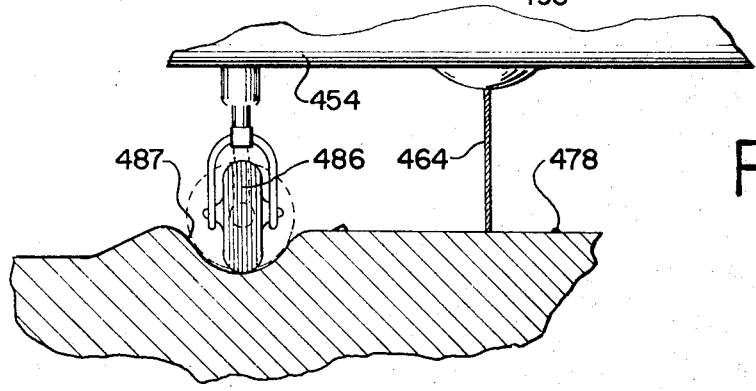

FIG. 38 shows a fragmentary sectional view of the dirigible cabin bottom and of the ground with the mooring cable and ball extended for engagement with the ground and a swivel landing wheel operable in an annular trench surrounding the mooring ground opening.

Figure 39:
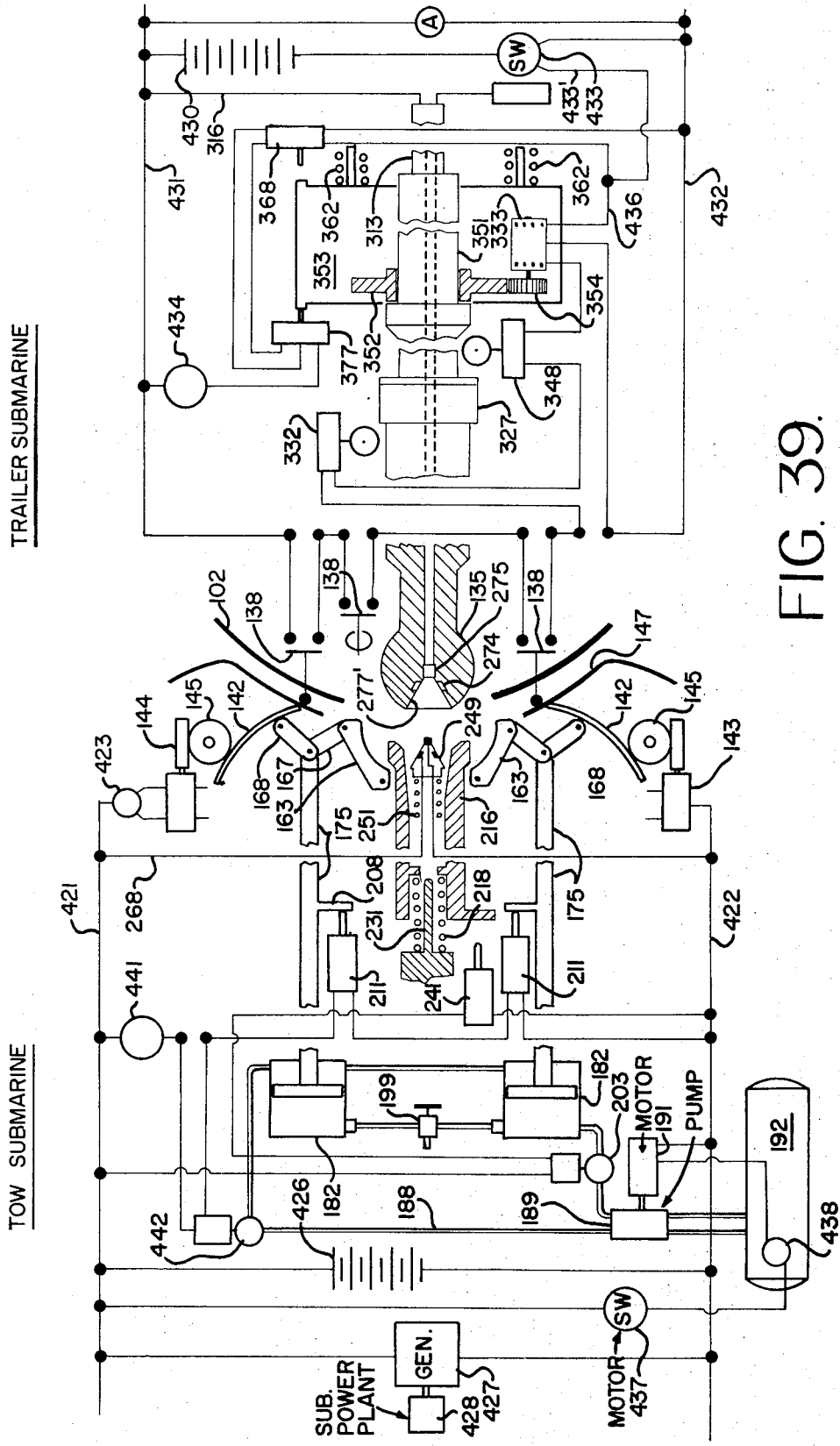

FIG. 39 is a diagrammatic wiring layout taken with a schematic view of the salient parts of the mechanisms.

Referring now particularly to FIGS. 1 to 4, there is shown a submarine train indicated generally at 100 consisting of one tractor or tow submarine 101 and two trailer or tanker submarines 102 and 103 and to which additional trailer submarines can be connected. The tractor or tow submarine 101 has a pilot station 104 in the nose of the craft and will carry the propulsion and electric generating systems serving to propel the submarine train and supply the necessary electric current for the actuation of the various auxiliary equipment needed in the tow submarine 101 and throughout the trailer submarines 102 and 103. In order that propulsion provided by the tow submarine 101 can be effected for the trailer submarines 102 and 103 a flexible coupling arrangement indicated generally at 106, the construction and operation of which being to what this invention is primarily directed and to a similar coupling arrangment 107 disposed between the trailer submarines 102 and 103 so that it will connect these submarines together. This coupling 106 and 107 must be automatic in its operation with the parts being instantly released only when a true axial positioning of the submarines has been effected with one another and wherein these coupling devices will include a switch connection that is automatically effected and will thereby allow current generated in the tow submarine 101 to be directed to the couplings 106 and 107 to the trailer submarines for the operation of their auxiliary devices and control systems.

Once the submarines are joined with one another and have effected axial alignment, the submarines should be able to swivel relative to each other in a universal manner throughout 360° and for all practical purposes to an extent of substantially 20° as illustrated in FIG. 3 so that the submarine train 101 can be directed through a curved path in any direction within the water, sideways, up or down or in any combination of movements so that the submarine train can be wormed past obstructions within the sea and under an ice layer 108 of arctic origin.

Once the coupling connection has been effected, the connecting parts to be later named, will be enclosed by an accordion type sheath 109, FIG. 3, carried on the trailing end of one submarine by its forward edge 111 and its rear and movable edge 112 fitted over and held tightly to the nose surface of a trailing submarine in a water-tight fitting engagement therewith.

The tractor or tow submarine 101 is generally larger than the other submarines 102 and 103 and is adapted to house a crew who can have access to the submarines through a water-tight three part shutter type door closure 113 constructed in a special manner as will be apparent later in the description for use for the connection therewith of a diving bell which can carry men to and from the submarine for operational or rescue purposes and make automatic coupling therewith while the submarine is submerged and even sunk onto the ocean floor.

The tow submarine 101 is provided with side bulges 114 and 115 on the respective opposite sides thereof and running a substantial length of the submarine and serving to house respectively forward and rearward adjustable horizontally extending fins 116 and 117 adjustably connected as best illustrated in FIG. 3 by respective pivot connections 116' and 117' to control when operated by mechanisms within the craft to cause up or down of the submarine to steer the submarine train 100 and at the same time assist the bulges 114 and 115 to give horizontal stabilization to the craft. These horizontal fins 116 and 117 can be adjusted up and down 20° and between dotted line positions as shown in FIG. 3 and thereby effect an up or down angling of the tow submarine 101 and the coupled trailer submarines through 20° and between dotted lines positions also illustrated in FIG. 3.

The sidewise steering of the tow submarine 101 will be effected by top and bottom steerable rudders and in tandem alignment with fixed vertical stabilizers 118' and 119' respectively.

The trailer submarines 102 and 103 may be constructed somewhat differently but generally are provided steerable fin members to effect some steering when coupled to the tow submarine 101 operated by electric current delivered through the coupling devices by the cables therewithin to the control actuators of the trailer submarines. The trailer submarine 102 has on each side longitudinally spaced bulges 121 and 122 housing respectively horizontally extending vertically adjustable fins or elevators 123 and 124 operating on pivots 123' and 124' respectively. The trailer submarines 103 has similar fore and aft horizontal elevator assemblies 126 and 127. Vertical stabilizers and rudder assemblies 128 and 129 are respectively provided upon the trailing ends of the respective trailer submarines. These rudder assemblies are provided at the top and bottom on the trailer submarines in a manner best shown in connection with the tow submarine 101. Trailer submarines 102 and 103 respectively have elongated top closure openings 131 and 132 for the loading and unloading of cargo thereinto. The trailing submarine 131 has a series of port hole openings 133 suitable for observation into the sea when passengers would be carried therein. An important present use for these submarine trains is for the handling of liquid cargo such as oil that may be needed to be transported from oil wells in the arctic areas and where transportation of this oil can be most effectively done in the sea and under ice.

In advance of the pilot area 104 in the tow submarine 101 is provided a ball piston coupling mechanism unit 134 best seen in FIG. 4 which normally has its ball 135 retracted and enclosed behind shutter type door closure opening 136 best seen in FIGS. 1 and 2 and which will be opened to permit the extension of the ball 135 at times when a connection is needed for reversing or backward movement of a trailer submarine in the manner much the same as freight cars are shifted by a shifter engine in railroad yards. When the train is made up the submarines will be aligned as shown in FIG. 1. In order to observe passage through the sea four front headlights 137 circumferentially arranged and spaced from one another about the conical nose of the submarine 101 and equally radially spaced from the center of the door opening 136 above and below the same and at opposite sides of the same and 90° apart. Also surrounding the door opening 136 in the nose of the submarine 101 and similarly in the nose of the other submarines as will be apparent as the description proceeds, are coupling engagement switches, three in number, circumferentially spaced from one another 120° apart and equidistant radially from the center of the opening 136 and being close to the periphery thereof. These engaging switches will serve to start the automatic functioning of the coupling devices when engagement is made between the trailing and forward ends of the submarines. All three switches will have to be operated by flush engagement and through axial alignment of the submarines with one another to effect the coupling of the crafts, one with the other. The switches 138 can be enclosed on the nose of the submarine by a flexible band of rubber-like material as indicated at 139 in FIGS. 4, 5 and 17. The same type of a ball piston coupling mechanism unit 134 with its ball 135 as abovementioned for use in the nose of the tow submarine 101 is provided in the nose of each of the trailer submarines 102 and 103 as can be best observed in FIGS. 5, 6 and 17. The ball thrust piston mechanism unit 134 is a self-contained one and is mounted and rigidly supported in the nose end of the submarine as a unit and in any conventional manner and can be removed inwardly into the submarine for replacement or repair. When the ball 135 is retracted into the mechanism 134 it will lie wholly within the nose of the submarine as shown in FIG. 17 and the front gate opening 136 housing three closure gates 141 of the shutter type generally of triangular shape and each of which spanning in width 120° so that their edges are joined together when the gates are brought into the closed position in the manner as shown in FIG. 2. These gates 141 should be watertight to keep out water and have a considerable advantage should the ball mechanism unit be removed from the nose of the submarine for repair. A device for operating gates 141 is shown in FIG. 5 for use in the operation of gates 142 in the trailing end of the tow submarine 101 and comprises generally an electric motor 143, a pinion worm 144 driven thereby and geared to a gear and work wheel 145 operable on a rack gear 146, FIGS. 12 and 13, to open and close the gates 142 with a funnel shaped opening surface 147 provided in the docking end of the tow submarine 101. These gates 142 by means of this motor 143 which is reversible can be worked between an open position as shown in FIG. 6 and a closing position as shown in FIG. 7. Aligning within the funnel shaped opening 147 and within the docking end of the submarine 101 is a self contained ball gripping mechanism unit indicated generally at 148 which like the ball unit 134 is mounted in the rear end of the submarine for easy withdrawal into the tow submarine for repair or replacement. The gates 141 and 142 of the respective trailer and tow submarines for closing the openings within the submarines that house the coupling mechanisms, are a part of the submarine and independent of the structure of the coupling units 134 and 148. In other words, these gates 141 and 142 are built into the submarine structure. It should now be apparent that the reversible motor and its gear drive mechanism 144-145 can be provided in the nose cone of the trailer submarine 102 of FIG. 17 to effect the opening and closing of the gates 141 therein. While the motor 143 in the docking end of the tow submarine 101 can be actuated by a manual switch at the time the submarines are to be coupled to one another and closed by the same switch the gates 141 in the nose of the trailer submarine can be actuated by the simultaneous engagement of the switches 138 with a cushioning ring 149 in the funnel shaped surface 147 in the docking end of the tow submarine 101. In order to permit the thrusting of the ball 135 of the ball piston mechanism 134 which can be likewise thrust simultaneously with the opening of the gates 141 in the nose end of the trailer submarine by the switches 138 in a manner which will be more apparent when later described. The gate operating mechanism for the gates 141 in the nose end of the trailing submarine 102 can be set between automatic and manual operation by switch means provided in the trailer submarine to thereby select between automatic operation and manual. The switches for the motors 143 in the respective submarines may also be lock switches that can only be operated by a key held by one in charge of the train.

As shown in FIG. 5, door guide rollers 151 are provided on the periphery of the ball clamp mechanism unit 148 at the rear end thereof and 120° apart between closing supports 152 and in slots 153 as best shown in FIG. 9 and scored for good gripping engagement with the underfaces of the respective gates 142 and respectively opposing the drive wheels 145 of the motor driven drive gears. The wheels will thus be bent out of the funnel shaped surface 147 in a positively driven manner to make for tight engagement of the doors with one another when they are extended into the surface opening 147. The similar guide roller arrangement can be provided for the gates 141 in the nose of the trailer submarine 102. As seen in FIGS. 12 and 13, the doors 142 are closed centrally and are sealed by mating sealing strips 154 and 155 in the edges of the gates 142, FIG. 13. These gates 142 are generally of triangular shape and are respectively operable in slots 156 in the docking end of the tow submarine which is generally of conical shape, rounded and with the respective gates 142 rounded to the same radius. The edges of the gates are provided with tongues to cooperate with grooves 158 in the edges of the slots 156 and these gates are workable between the closed position shown in FIG. 14 and a dotted line partially open position and to full open position as shown in FIG. 6. When the gates are closed, as shown in FIGS. 7 and 14, the apices of the respective gates 142 come together at a central point 159 that is in the extension of the axis of the grip ball mechanism 148 and of the submarine 101. It should still be understood while not shown that the gates 141 of the nose end of the trailer submarine 102 are similarly constructed and arranged and guided between open and closed positions.

In FIGS. 10 and 11, there is shown a detailed construction of the ball grip clamp mechanism unit 148 which includes a main body 161 in which all of the parts are assembled and supported for automatic operation with the engagement of the ball 135 of the ball thrust mechanism 134 that is contained in the nose end of the trailer submarine 102. The body 161 has a front cavity 162 adapted to receive the ball 135. In this cavity there are pivotaly mounted three ball grip clamps 163 by forward pivot pins 164 which can simultaneously close upon ball head 135 shown in FIG. 10 and an open position in which the ball head 135 has been released as shown in FIG. 10. The free ends of the ball grips 163 are worked between closed and open positions by toggle links 167 and 168 respectively pivotally connected at 169 to the ball grip 163 and at 171 within the end space 162 to the unit body 161 and to a work link 172 and to each other by a common pivot pin 173, FIGS. 9, 10 and 11. The link 172 is connected by a pivot pin 174 to a work rod 175 that extends longitudinally through the unit body 161 and extends into axially aligned openings 176 and 177, each of which respectively having a seal 178 and 179 to keep water from passing into the unit body 161 and upon electrical contact areas. This rod 175 is connected to a piston rod 181 of a two way fluid operating cylinder device 182 by a turn buckle nut 183. There are three such rods 175 and cylinder devices 182 on the unit body 161 that are respectively connected through toggle links 167 and 168 with the respective ball grips 163 to operate the same. The arrangement is such that all three of the ball grips 163 are worked in unison by separate fluid devices 182 having control means for simultaneously supplying the cylinder devices with fluid in both directions. In other words the ball grip clamps 163 are worked simultaneously together between grip and non-grip positions about the ball 135.

As best seen in FIG. 5, the fluid cylinder devices 182 project forwardly from a flanged wall 184 of the unit body 161 by which the ball grip clamp unit 148 is mounted upon and within the interior of the tow submarine structure and made secure by bolts 185 thereupon which enter an inturned flange 186 of the submarine structure.

The three cylinder devices are supplied with fluid at opposite side of pistons 186 by respective hose lines 187 and 188 leading from a fluid pump 189 driven by an electric motor 191 and supplied with fluid such as oil from a reservoir by hose connection 193 with a return of the fluid to the tank through a return line 194. In the conduit 187 at the point of connection with the each of the cylinder devices 182 is a one-way valve 196, FIG. 11 that will maintain the liquid delivered to the cylinder device 182 in the end thereof to prevent the release of the piston 186 after it has been driven against an annular shaped stop ring 197 in the rim of the device 182 so as to maintain the toggle links 167 and 168 in their extended and open positions so the ball 135 is held captured by the ball grip clamps 163. In order to release the liquid from the forward end of the cylinder device and allow the piston 186 freedom to return to its forward position under the action of fluid delivered to the opposite side of the cylinder device 182 through the pipe line 188, cam lock return 198 is connected to one-way valve 196 and controlled by a cam release 199. Liquid is pumped through the line 188 to the opposite side of the cylinder device 182. A hose line 198 extends from each of the one-way valves about respective cylinders and valve 199 preferably has three inlets, one for each cylinder device and one outlet 201 connected by a fitting 202 to the hose line 187, FIG. 5. The pipe line 187 has a solenoid operated valve that will work in the pump assembly 189 and will be operated by appropriate electrical controls as the coupling of the vehicles is effected. This valve will be opened in a manner to be described to close the ball grips 163 about the ball head 135.

The piston 186 has piston rings 204 and its piston rod 181 has a central hole 206 that extends through the piston body 186 to receive a central guide shank 207 that extends inwardly from the closed end of the cylinder device 182 and into the piston opening 206 to stabilize and guide the movement of the piston 186 and prevent the jamming thereof. The stop ring 197 surrounding the piston rod 181 limits the movement of the piston. The operating rod 175 is connected to the piston rod 181 by the turn buckle nut 183 whereby adjustment of the nut 183 may shorten or lengthen the effective length of the operating rod 175 so that the over center position of the links 167 and 168 with the ball grips 163 of the ball head 135 can be made certain and with the liquid held in the cylinder device by the one-way valve 196 a positive locking of the ball grips 163 in their gripping and towing positions is effected. All three of the operating rods 175 and the cylinder devices 182 therefor are similarly adjusted and operated simultaneously by common control devices.

Extending inwardly from each rod 175 is a switch operating arm 208, FIGS. 10 and 11, which will engage a switch pin 209 of a switch 211 rigidly carried in a transverse partition 212 of the unit body 161 and has a cam 213 that extends outwardly therefrom and thorugh open side 214 in the peripheral wall of the unit body 161 and connected into a control system in a manner to be later described for effecting the automatic closing and in some instances opening, of the water closure gates 142 of the ball grip unit 148 and simultaneously with the actuation of the rods 175 and their cylinder devices 182 so that the gates 142 automatically close and the ball grips 163 have been opened and the ball head 135 released.

In order that the actuation of the ball grip members 163 is effected automatically and only when the ball head 135 is centered well within the ball grips 163 and instantaneously to capture the ball head 135 therewithin, a sensor piston 216 which has an enlarged diameter open head 217 that normally lies when the ball grips 163 are in their open position as shown in FIG. 11, projected into the space between the ball grips so as to be engaged by the ball 135 that will forcibly cause the sensor piston 216 to be thrust forwardly against the action of its return spring 218. The forward end of the sensor piston 216 will engage a stop shoulder 219 and the piston 216 will be locked in this position by the engagement of rounded nose 221 of a cam lever 222 into an external annular groove 223 in the end of the piston 216 in the manner best shown in FIG. 10.

The sensor piston 216 is centrally disposed in a central bore 224 containing sealing rings 226 to keep out water while permitting axial movement of the piston 216 and an axially aligned hole opening 227 in the sensor partition wall 212 and having a sealing rings 228 for this same purpose and to keep water from entering the submarine through the slots 214 in the periphery of the unit body 161.

The forward end of the sensor piston 216 has a central opening 229 for accommodating the piston return spring 218. A guide pin projection 231 extends forwardly from the stop shoulder 219 and into the spring chamber 229. Return spring 218 surrounds this projection 231 and is kept thereby with the opening 229.

One of the rods 175 has a roller arm 232 with a roller 233 engaging cam edge 234 of cam 222 and as the rod 175 is worked rearwardly to close the ball grips 163 the roller 233 will deposit the nose end 221 in the groove 223 of the sensor piston 216 and thereby lock the sensor piston in its retracted position. The cam lift 222 is pivoted on a rearwardly extending bifurcated bracket 236, extending from the flanged closing wall 184 of the unit body 161. The lever 222 pivots on a pivot pin 237 and is urged to be pivoted toward its locking position by a spring pressed follower 238 lying in the stop projection 219 that extends centrally rearwardly from the flanged closing wall 184.

As the sensor piston 216 is forced rearwardly to its retracted and its locking positions, the operation of the fluid cylinder devices 182 and the rods 175 to close the ball grips is initiated by the engagement of the grooved end of the sensor piston engaging with a switch roller arm 239 of switch 241 from which a cable 242 leads through one of the body openings 214 to a control center. This switch 241 will turn on the electric motor 191 and the hydraulic pump 189, FIG. 5.

It should be apparent that the operation of the ball grip mechanism 148 is automatic upon the engagement of the ball 135 with the enlarged head 217 of the sensor piston 216 and the movement of the piston 216 by the ball head forwardly for engagement of the switch roller arm 239 and the lock lever 222 with the sensor piston. The ball 135 while retained by ball grips 163 may swivel laterally in all directions amounting to universal movement therein.

Another feature of this invention besides providing for an automatic coupling of the submarines together as well as the respective coupling mechanisms therefor being automatic, is the provision of an opening through the coupled mechanism so that communication can be made between the submarines by means of an electrical connection provided in the sensor piston 216 that is released and retracted automatically with the actuation of the ball grip mechanism unit 148. In the sensor head 217 is a central opening 243 funnel shaped at its other end to provide for a stop for a seal 244 of a harpoon like or stabbing tapered switch plug 249 adapted to be thrust by its compression spring 251 reacting against a shoulder 252 when its forwardly extending connecting cable 253 is released. Upon the plug switch head 247 is a contact ring 254 and a central contact pin 256. This switch plug 249 is adapted to be thrust into a cooperating socket in ball head 135 to establish an electrical connection therebetween automatically in a manner to be described more in detail later on.

The cable 253 is tightly gripped within the central opening 243 of the sensor piston forwardly of the spring stop shoulder 252 thereof by an elongated tight gripping sleeve 257 that works through a series of spaced sealing rings 258 in order to prevent leakage of water through the sensor piston and into openings within the unit body 161.

The cable 253 is led outwardly over a large roller 259 carried on a bracket 261 and thrust into a slot 262 that leads from the forward end of the central opening 243 and laterally through the side of the sensor piston to keep the cable axially aligned within the central opening 243 of the sensor piston. A pivoted keeper 263 retains the cable 253 on the grooved roller 259.

The plug switch cable 253 extends further laterally and over a smaller guide roller 264 pivoted on an internal boss 266 upon the side wall of the unit body 161 and forwardly through the unit body for fixed engagement with a work arm 267 carried on one of the ball clamp work rods 175 so that the cable is released only when the work rods 175 are moved rearwardly to close through their toggle links the ball clamps 163. As the arm 267 with the cable 253 moves rearwardly the plug switch work spring 251 can release the switch plug 249 so that it will be forced into a socket of the ball 135 to establish an electrical connection therewith in a manner to be later described. The cable 253 has a lost motion loop 268 forwardly of the arm 267 and extends tightly through a bushing 269 in the transverse wall 212 of the unit body and outwardly through a slot 214 in the unit body wall.

In FIG. 10, the switch plug 249 is shown extended into the ball 135 from the retracted position of the sensor piston 216 and with the loop 268 of the cable 253 extended and open.

In order to prevent within the slotted end of the central opening 243 into which the cable roller 259 extends from engaging with the metal of the piston and to provide at times a braking action upon the cable an inwardly curved triangular shaped soft plastic or rubber cushioning member 271 is fastened by a shouldered snap projection 272 in a counter board hole 273 in the wall of the sensor piston 216 opposite the In FIGS. 15 and 16 there is shown the ball 135 joined with the ball grips 163 and enlarged to more clearly show the connection of the switch plug 249 with ring contacts 274 and 275 embedded in an open end of an elongated insultaing plug 276 tightly fitted within a central hole 277 in the ball head 135 and a rearwardly extending ballshank 278 and leading from its tapered open end 277' into which switch plug 249 is thrust and tightly fitted so that its contacts 254 and 256 will respectively make contact with the contacts 274 and 275 in the insulated plug 276 and to establish electrical circuit connections for wires 279 and 281 in the switch plug cable 253 with wires 282 and 283 respectively passing inwardly into the trailer submarine for the transmission of electric current from a generator in the tow submarine 101 to auxiliary equipment including batteries in the trailer submarines 102 and 103 from which operation of the ball head mechanism 134 can be effected and for its control thereby. The water tight seal 248 provided on the switch plug 249 and serving when the switch plug 249 is in the sensor piston head 217 to keep out the passage of water into the sensor piston 216 will fit in a reverse manner in the tapered opening 277' of the ball head 135 to keep water from passing into the ball head and between the contacts 254 and 256 of the switch plug 249 such as would create a short-circuit therein. Every effort has to be made to keep the open end 273 in between the contacts. Prior to the making of the connection of the switch plug with ball contacts 274 and 275, the circuit opening in the insulated plug 276 and in the tapered end of the opening 277 of the ball 135 is blown outwardly by air from an air passage 284 leading upwardly through a stem portion 276' of the plug 276 and having its outlet at 286 entering the plugged opening 287 that receives pin contact 256 of the switch plug 249. In order to have a maximum ball surface on the head 135, its rearwardly extending shank 324 is tapered and reduced in diameter adjacent to its ball surface at 325. Sealing rings 326 are provided for the ball shank 324 in the opening 323 to keep out water from the interior of the ball mechanism unit 134. Integrally formed on the rear end of the shank is a bore or stop shoulder 327 that will engage a stop shoulder 328 provided in the body of the nose section 301 so as to limit outward movement of the ball head and its shank. Ball surface is enlarged rearwardly of the stop shoulder 328 to accommodate the enlarged portion 327 of the shank and has four parallel forwardly extending ribs 329 that are received in the grooves 330 in the enlargement 327 whereby to restrain the ball head and its shank against rotation about its axis thus permitting at the same time fore and aft adjustment of the ball head and its shank. When the enlargement 331 of the ball shank engages the stop shoulder 324 a limit switch 332 is activated to stop rotation of driving motor 333, the operation of which will soon be described.

Shaft 313 serving as an extension for the ball shank is separately formed and connected to the rear face of the ball shank enlargement by a flange 334 and bolts 336. The forward end of the cylindrical section 304 has an end face portion running coextensively with its attaching outer peripheral flange that is connected to the flange 303 of the nose section 301 by the attaching bolts 319. Through this radially inwardly extending portion 337 are further attaching bolts 338 for connecting the section 304 with the nose section 301. This portion 337 has a central opening 339 which will accommodate a ball shaft extension and is of a diameter to serve as a rearward stop shoulder for the flange 334 when the ball head is retracted. The nose section has a longitudinally extending opening 341 and cable 342 connected with which the limit switch extends in it. This cable 342 passes through a hole in the portion 337 of the section 304 and outward through a hole 343 in the cylindrical wall. In order to install the switch 332 in its location in the nose section adjacent stop shoulder 328, an opening 344 is made into opening 341 and closed by a plug 345.

Extending rearwardly from the flange 334 of the shaft 313 is a smooth cylindrical portion which moves upwardly through the hole 339 in the connecting face portion 337 of the section 304 and has at a measured distance from the flange 334 a cam shoulder 347 that will engage an operating roller of a further limit switch 348 that works in conjunction with the stop switch 332 so as to insure the stoppage of the electric motor 333 when the enlarged portion 327 of the ball shank 324 engages the stop shoulder 328. From this switch 344 is cable 349 which extends outwardly through the casing section 304. A switch is positioned to work in unison with the switch 332 and when connected therewith a safety feature is provided to ensure the disconnect and stoppage of the electric motor 333 when the ball shank and its ball 135 has been thrust outwardly to its maximum extent in order to effect brakage of the operating parts.

On the ball shank extension 313 extending rearwardly to a substantial distance from the cam shoulder portion 344 is a substantially long threaded portion 351 which in turn engages driving gear 352 which is carried in a shock absorbing dampening assembly indicated generally at 353. The electric motor 333 is carried in this same assembly 353 and has a drive gear 354 that meshes with the gear 352 which upon its internal threads being worked on the threaded portion 351 of the shank extension 313 will cause the outward thrust of the ball shank 324 and the ball 135 and to a maximum extent when the dampening assembly 353 is in its forward position shown in FIG. 19.

Extending inwardly into the opening 287 of contact pin 256 is a spring pressed switch operated plunger 288 that is thrust inwardly by the contact pin 256 to close switch arm 289 of a main switch to establish connection with a contact 291 connected with incoming wire 283 and with a continuation 283' of this wire 283. Only with this main switch 283 closed will current pass between the submarines to charge batteries in the trailer submarines 102 and 103. When the switch plug 249 is retracted the wire to the contact ring 274 of the ball plug 276 will be free of electric current and uneffected by water.

In FIG. 16 an illustration is made as to the manner in which the ball head 135 may swivel in the closed ball grips 163 without interfering with the connection of the switch plug 249 with the ball head 135 since the cable 253 may bend without effecting any pull by the cable upon the plug 248 to disengage it from the ball 135 and wherein the force of the spring 251 surrounding the cable may continue to keep pressure upon the switch plug 249.

A detailed description has now been given of the ball grip mechanism unit 148 and in the manner in which its ball grips 163 are made attached to the ball head 135 of the ball mechanism unit 134 and as to the manner in which the electrical connection is established between the ball grip mechanism unit and the ball head, the workings of the closing of the ball grips 163 upon the ball 135 and the thrusting of the switch plug 249 into the tapered opening in the ball being initiated by the ball 135 upon its engagement with the head 217 of the sensor piston 216 thereby setting the ball grip unit 248 into automatic position. A detailed description of the ball head mechanism unit 134 will now be made. The housing for the ball head mechanism unit 134, as best seen in FIGS. 18, 19 and 20 comprises a forward nose section 301 from which ball 135 is thrust and having mountings 302 and 303, and intermediate flanged cylinder section 304 having a flange 305 connecting the cylinder 304 to the flange 303 of the nose section. A further intermediate flanged cylinder section is connected to a rear flange 307 by pin 308 and to which a flange 311 of a final closure section 312 is connected and through the rear end of which operating shank 313 is projected and retracted and which has on its rear end an electrical cable pulley 314 through which electrical cable 315 extends and which is kept bound on a cable spring spool 317 mounted on the closure section flange 312 by a bracket 318. The mating flanges of the several sections are made secure together by a series of circumferentially spaced fastening bolts 319.

The nose section 301 is rounded at its forward end and is formed of a heavy and thick metal mass. It is mounted and supported in the nose of the trailer submarine 102 by its mounting flange 309 and fastening bolts 321 entering a shoulder formation or fabricated structure 322 in the also rounded nose of the submarine 102 that has three circumferentially spaced docking switches 138 disposed behind an enclosing band 139, one switch for each of the ball grip members 163 of the ball grip mechanism unit 148. The cushioning annular projecting member 139 surrounding the nose surface of the submarine 102 is to enclose the switches 138, the FIG. 5. This nose section 301 has a central opening 323 through which the ball head 135 is projected or retracted. Spaced rearwardly from the forward end of cylindrical unit 356 and having a central opening 357 is an extension 313 extends. From this wall 356 are three guide rods 358 that respectively pass through the dampener assembly 353 through the further intermediate cylindrical section 306 and the enclosure section 312 and through an end wall 359 and maintained against forward displacement by end tightening nuts 361. These rods each have elongated heavy duty shock absorbing compression springs 362 that are seated in recesses in the inner face of the enclosure portion 359 of the section 312 as indicated at 363 and at their upper ends about bosses 364 on rear cylinder portion 366 having the internal diameter of the section 306 and piston rings on its outer periphery to be worked thereagainst. Rearward movement of the dampener assembly 353 will compress the springs 362 in the manner shown in FIG. 20. When great shock is taken upon the ball 135, its shank and shaft extension 313, this shock will be transmitted through the dampener assembly 353 and initially absorbed by the compression springs 362. The function of the dampening assembly 353 will become apparent as the description proceeds but for the present it should be understood that the dampener mechanism 353 will be throttled in its return movement and the shocks thereby snubbed.

If the ball head 135 and its shank extension meet with an obstruction as illustrated in FIG. 20 so that the ball 135 is depressed from its extended dotted position as upon engaging a wall 366, the dampener 353 will have been thrust rearwardly to its rearward most position with the springs 362 substantially fully compressed and the end portions 363 of the dampener mechanism assembly now engaging through its boss 363' a limit switch plunger 367 of a switch 368 carried on the wall of the rearmost closure section 312. Switch 368 will start the electric motor 333 in the dampener assembly 353 so as to cause the dampener assembly 353 to climb upon the threaded portion 351 of the ball shank extension and this dampener assembly 353 may be advanced by the motor 333 until a threaded pin 369 adjustable in an internally threaded forwardly extending boss 371 of a forward piston part 372 of the dampener 353 and held in its adjusted position by a lock nut 374, engages a plunger 376 of a stop limit switch 377 having its cables 378 extending outwardly through a hole 379 in the side wall of the intermediate unit section 304 with the cable 349 of the switch 348. This switch 377 is supported upon the transverse portion 356 which carries the guide rods 358 that have the shock absorbing springs 362 at their rearward ends. These guide rods 358 also hold the dampener mechanism 353 against rotation about its axis and the adjustable threaded pin 369 in longitudinal alignment with the pin 376 of the stop limit switch 377. Once the dampener assembly 353 has moved forwardly, the ball 135 will again be held in its retracted position as shown in FIG. 19 and extended again when the switches have properly engaged the conical surface 147 of the tow submarine in the manner illustrated and described in connection with FIGS. 5 and 17.

A description will now be made more in detail of the dampener assembly 353. The rearward portion 363 is provided with piston rings 381 which work against the inner surface of the intermediate unit section 306 to confine oil or other dampening liquid in an annular chamber 382 formed of a forwardly extending integral extension 383 and forward piston plate 372.

The annular oil space 382 is closed by the forward piston plate 372 which has piston rings 384 that will work against the inner surface of the intermediate unit section 304. This piston plate 372 encloses the work gear 352 within a forward transverse portion 386 of the annular portion 383. The plate 372 is held in place upon the portion 386 by bolts 387. The gear 352 is fixed for rotation therebetween by forward and rearward ball bearing units 388 and 389.

The flange 308 of the intermediate unit section 306 has a forwardly extending annular lip 388 into which the flange 307 on the unit section 304 is fitted and the radially inwardly extending flange formation 390 that extends into the oil chamber 382 to provide a restrictive passage 391 between the opposite sides chamber 382 and with the exterior face of the annular wall extension 383. The chamber 382 can be filled with oil by removing a plug 392 in the wall of the unit section 304. Draining of the chamber can be effected by the removal of a plug 393 in the flange 308 and from a passage 394 adapted to remove the oil within the chamber 382 from inwardly extending flange formation 390.

When the ball and its shank extension 313 has struck an obstruction to force inwardly the ball head as illustrated in FIG. 20 from its extended position shown in FIG. 8 not only will the compression spring 362 be compressed but oil in the chamber 382 will be forced rearwardly through the restrictive area 391 into the rear end of the chamber so that as the dampener assembly 353 starts to return this return will likewise be dampened as under the action of the compression springs 362 the assembly 353 is forced forwardly and oil in the chamber 382 under action of the springs will flow in reverse through the restrictive area 391 into the forward end of the chamber 382. This action continues until the electric motor assembly 333 has returned the dampening assembly 353 from the position shown in FIG. 20 to the position shown in FIG. 19 with the ball and its shank extension fully retracted and in position to be operated again when the forward switches 138 on the submarine has made the proper engagement with the wall surface 147 for effecting the normal coupling action.

With the engagement of the ball 135 with the ball grip mechanism unit 148, the plug 249 will have established as above described, a connection with wires 283 and 293' that will run through the ball and its shank extension and in continuation thereof made into the form of the cable 316. A longitudinal opening as indicated in dotted lines at 396 in the shaft extension delivers the cable 316 to its rearward end and over the pulley 314 and thence over the collector spring spool 317 carried on bracket 318.

As seen in FIGS. 29 and 31, a spiral spring 397 is connected to the spool at 398 and anchored on the bracket at 399. This spring will cause the reeling of the cable upon the spool 317 as the ball and its shank extension is extended from the unit and will take up any slack in the cable 316.

The spool 317 has a central inner tube 401 that has a series of ring contacts 402 longitudinally spaced from one another with radially inwardly extending terminals 403 having wires 404 that lead to a pin type plug receptacle 405 to which a mating receptacle with a cable 406 can be attached for turning off and on current for various controls. The plug receptacle 405 is releasably held by opposing hinged spring clips 407 and 408. The tube 401 is held fixed against rotation between the spaced brackets thereof.

The spool 317 has an inner sleeve 409 that is cut away at one side of its periphery to provide a recess 411 in which a series of contacts 412 are fixed to extend inwardly and respectively engage the ring contacts 402 on the tube 401. The cable 316 may have a plurality of power and control wires and these wires may be connected to contacts 412 as desired. Surrounding the inner sleeve 409 is an outer sleeve 413 on which the cable 316 adjacent the terminal recess 411 in the sleeve 413 is a door for closing off the recess 411 that houses the terminals 412. The cable 316 will thus be wound upon the outer sleeve 413 and the spool 317 will be rotated upon the central contact tube 401. The ball mechanism unit is supported in the nose of the submarine in any suitable manner as by circumferentially spaced mounting brackets 418 so that the towing forces acting upon the ball 135 will be transmitted to the main body of the submarine, FIG. 28.

In operation, the coupling of the trailer submarine with the tow submarine is effected automatically upon the nose of the trailer submarine engaging the inward conical surface 147 of the tow submarine when the gates 142 have been opened. While much has been described relative to the operation of these coupling mechanisms, it is believed now that a general description of the operation taken in connection with a diagrammatic showing of FIG. 39 will make the automatic feature more apparent.

As described there are three closure gates 142 on the rear of the tow submarine and each of them are operated by separate motors 143 through appropriate gearing and engagement with rack teeth on the interior of the gates. There are three such gates 142 and a motor 143 is provided for each gate. These motors are connected in series with one another and across power lines 421 and 422 of the power submarine. When it is desired to effect the opening of the gate members 142, a manual switch 432 will be turned to one direction and when a reversing or closing movement of the gates are desired, the switch 423 may be turned to another position to change the direction of current through the electric motors 143 which are reversible. Thus the gates 142 are opened and closed at the will of the operator.

Electric current is provided to the main lines 421 and 422 by either a battery source 426 or a generator source 427 driven by submarine power plant 428. The battery 426 is kept charged by the generator 427 and in a manner that will be made more apparent this same generator 427 will keep the batteries of the trailer submarines charged.

With the gates 142 of the tow submarine opened, the nose of the trailer submarine 102 may engage upon the concaved surface 147 on the tow submarine. Upon the trailer submarine making a true axial engagement with the two submarine so that all three switches 138 on the nose thereof are simultaneously operated, lying in series with one another but normally opened and also in series with dual operated normally closed switches 332 and 348 and the electric motor 333. With all five switches being closed, the electric motor 333 will drive through its gear 354 and gear 352 a threaded coupling of the gear 352 upon the threaded portion 251 of ball 135 and shank extension 313. Electric current is taken from a battery 430 lying across main lines 431 and 432 of the trailer submarines. A key operated switch 433 lying in the battery circuit has to be opened for current to run between the main lines 431 and 432 and this can only be done by one holding the key for the switch 433 so as to thereby prevent unlawful use of the trailer submarine except by one who lawfully holds the key to the switch. The ball head 135 moves forward instantaneously until the dual limit switches 332 and 348, one or the other, or both, are opened to disconnect the motor drive 333. The electric motor 333 is a reversible one and should it be desired to retract the ball 135 it can be effected by closing switch 434 so that current will flow to a normally closed limit switch 377 that is connected with a rear limit switch 368 and electric motor 333 through wire 436 is connected to a reverse winding of the motor 333. This wiring is such that the dampener assembly 253 is always maintained in a forward position. Should the ball 135 be engaged by an obstruction and the dampener assembly 253 engage switch 368, the direction of rotation of the electric motor 333 will be such as to cause the climbing of the assembly 253 upon the threaded extension 251 and return to its forward most position and retract the ball 135 into the mechanism and free of the obstruction.

With the engagement of the two submarines properly made and all three switches 138 closed, the ball 135 is advanced and will engage sensor plunger 216 against the action of spring 218 surrounding a pin 231 and the closing of switch 241 which will open fluid control valve 203 so that fluid under pressure is delivered from pump 189 and fluid tank 192 all under pressure. The tank 192 is kept fully charged by the motor 191 upon turning on the switch 437 and upon a pressure switch 438 on the supply tank 192 being closed. The electric motor 191 will keep the supply tank 192 fully charged and under pressure so that sufficient pressure will be delivered to the pistons 182 to cause the forward movement of the rods 175 and the closing of the ball grip clamps 163 instantaneously about the ball head 135 to thereby effect the final closing and connection of the trailer surmarine upon the tow submarine.

At the same time plunger 216 is retracted, electrical connection plug 249 is moved forwardly under the action of its extension 251 lying in the sensor piston so that its head 249 enters the tapered opening 277' of the ball head 135 to make contact therewithin with contacts 274 and 275 thereof. Since the cable 268 lies across the lines 421 and 422 battery 426 and generator 427 of the tow submarine will supply current to the wires 283 and 283' within the ball shank extension and cable 316 to place a charging length of current across battery 430 of the trailer submarine. Thus the establishment of the connection of the trailer submarine with the tow submarine for the passage of electric current to the trailer submarine has been effected.

When it is desired to release the trailer submarine from the tow submarine, the hand operated valve 199 is turned to unload the trap valves 196 connected to the forward ends of the cylinders 182 and at the same time a switch 441 is opened to open magnetic valve 442, the pressure line 198 that delivers oil under pressure to the rear ends of the cylinders 182 thereby to effect a rearward action upon the rods 175 and a release of the toggle links 167 and 168 and the release of the ball grips 163 from the ball 135, allowing the trailer submarine to fall back from the tow submarine. The magnetic valve 442 is connected in series with the switch 441 and with normally closed switches 211 that are opened to limit the rearward movement of the rods 175 by engagement of the arms 208 thereof with the switch pins and to thereby stop the opening movement of the ball grips 163. Thereafter the switch 423 can be operated to effect a reversing movement of the reversible gate motors 143 and thereby effect the closing of the gates 142 until such time as it is desired to connect the trailer submarine again to the tow submarine. The various hand operated switches of the two submarine can be key operated to thereby prevent the use of the tow submarine for connection with a trailer submarine except by one who lawfully has the key.

The switch 433 receives one of the cable wires of the cable 316 and is a two-way switch operable when the flow of current is directed to be transmitted through the cable wires to effect the flow of current through wire 433' and wire 436 and reverse drive motor 333 for the ball 135. Thus when the electric connector plug 249 of the ball grip unit on the tow submarine ceases to deliver current to the cable 316, the ball 135 and the shank extension 313 will be automatically retracted through the operation of switch 433 and the reverse winding of the motor.

Referring now particularly to FIGS. 32 to 38, there is shown the adaptation of the ball head and grip mechanisms above described provided in a dirigible aircraft 450 as respectively indicated at 451 and 452 so that dirigibles can be connected together in the same manner. This dirigible 450 has the usual flotation bag 453, a control cabin 454 depending therefrom, and vertical and horizontal tail stabilizers 455 and 456. Propeller engines 457 and 458 respectively are mounted on the fluid filled bag 453 at the opposite sides thereof.

The ball mechanism has a ball head 461 that corresponds to the ball head 135 that is retractable preferably when made in accordance with the ball head mechanism but will be extended when put into use. It is apparent that ball mechanism 451 could be of a simple type with but a single ball head extending rigidly from the nose of the aircraft bag 453.

About the tail end of the craft is provided with angled gates 462 which could be closed by a motor operated manual device as above described and opened by the same device in order to provide access to ball grips for the mating ball head 461 of a trailing dirigible. The entire coupling condition can be effected more readily than with submarines because the buoyancy is in air instead of in water.

A similar one of the ball grip mechanisms can be provided in the ground for effecting the mooring of the aircraft. A ball grip 463 will be lowered with a cable from the control cabin 454 by a winch 466 operated by an electric motor 467 and connected to the winch by a pulley belt 468, FIG. 37.

This ball grip mechanism is indicated generally at 470 and while operating in general somewhat similar to the ball grip mechanism above described, it includes ball grip clamps 471, three in number and a sensor pin 472 that will be engaged by the ball grip 463. The ball grip 463 has a radio apparatus 473 which will receive the necessary signals to indicate to the operator of the dirigible that the ball 463 is properly homing into the ball grip mechanism 470. The grip mechanism 470 with appropriate radio apparatus is provided for use with the radio apparatus 473 in the ball 463.

Angle mating gates 478 may be opened by radio signals and are operated in the same manner as above described by an electric motor 479 having a worm 481 that operates a worm wheel 482 that engages rack teeth 483 on the underface of the gate 478. When the ball 463 has finally entered the opening in the grip mechanism well and the sensor pin 472 is depressed by the ball 463, the ball grips 471 will be closed about the ball 463 by toggle mechanism 484 in the manner above described whereby to hold the ball 463 fast to the ground and the mooring operation will have been completed in an automatic manner. The gates 478 can be closed by reversing the direction of current through the motor 479 and the end of the gates made to close flushly about the cable 464. A swivel connected landing wheel 486 depending from the cabin 454 will, as the dirigible is drawn to the ground enter a wheel guide groove 487 in the ground surface and concentric with the cable 464 to keep the aircraft from laterally shifting in such a manner as would deflect the cable 464 as would place undue force on a single one of the ball grips 471.

The winch 466 in the floor of the cabin as indicated at 489 to which access may be had through lift doors 491 and 492. The ball 463 will be housed in a ball recess 493 in bottom floor wall 494 and upwardly recessed thereinto. It should now be apparent that the same principle which has been applied to submarines can be applied to dirigible aircraft for the coupling together of one or more dirigibles and that the ball grip mechanism, automatic in its operation can be adapted to use for effecting the mooring of the aircraft wherein a ball lowered from the aircraft can be radioed home to the ball grip mechanism.

It should now be apparent that with the coupling mechanism which has been described the automatic coupling of the vehicles can be readily effected, the coupling being done in response to the proper aligning of a trailing vehicle with a tow vehicle to effect through a sensor the operation of the ball grip mechanism for the ball grip clamps to encompass the ball head of the retractable ball mechanism on the trailing vehicle. In these coupling mechanisms, adequate provision is made for the passage of electric current through the connection by way of cables and a retractable plug provided on the ball grip mechanism and in the sensor plunger thereof. The connection of the electric plug being made automatically with the opening in the ball head as the ball grip clamps are closed about the ball head 135, 461, or 463 of the mechanisms above described. The retraction of the ball heads can be effected automatically with a disconnection of the mechanism from one another and opening of the electric current that passes through the connector from one vehicle to the other. Key operated switches are preferably used to prevent operation of the mechanisms by unauthorized persons.

While various changes may be made in the detailed construction, it shall be understood that such changes shall be within the spirit and scope of the present invention as defined by the appended claims.

We claim:

1. In combination, a tow submarine, dirigible or other buoyant vehicle having nose and trailing ends, said vehicle having a central axially aligned opening generally of conical shape in its trailing end, a ball grip power actuated mechanism having a plurality of ball grip clamps centrally located within the vehicle and axially aligned with the central opening, a sensor device lying centrally within the power actuated mechanism and automatically operable in response to movement of the sensor device to effect the actuation of the ball grip power actuated mechanism and the closing of the ball grip clamps, a trailing submarine or other buoyant vehicle having a retractable ball head mechanism mounted in the nose of the trailing submarine and when extended having a ball head projected therefrom in the axis of the trailing submarine, said ball head adapted to enter the central opening of the tow submarine and engage the sensor device therein whereby to effect the automatic closing of the grips upon the ball head and the coupling of the two submarines or like buoyant vehicles.

2. The combination as defined in claim 1, and said retractable ball head mechanism having power operated means for effecting the extension and retraction of the ball head thereof, the nose end of said submarine being generally of conical shape and adapted to enter the central conically shaped opening in the rear end of the tow submarine and engage the internal surface thereof, switch means lying in the conical nose surface of the trailing submarine and engageable with the conical surface of the tow submarine, said power means for operating the ball head mechanism being connected to said switch means and operable in response thereto whereby said ball head will be extended into the ball grip mechanism only when the nose of the trailing submarine has been centered within the conical opening in the rear end of the tow submarine.

3. The combination as defined in claim 1 and said power mechanism for effecting the operation of the ball grip clamps including toggle links, fluid cylinder devices connected with the toggle links to operate the same by fore and aft movement thereof and a cam lever latch operable by the movement of said fluid cylinder means for engagement with the sensor device to hold the sensor device in its retracted position once acted upon by the ball head of the trailing submarine.

4. The combination as defined in claim 3, said fluid cylinder devices being adapted to carry fluid to the opposite sides of the pistons thereof, one way valve means associated with each cylinder device to hold its piston extended and the ball grip clamps in their locked positions, valve passage means for releasing the one way valve means cylinder devices and switch means operable by the sensor device when engaged by the ball head of the trailer submarine to effect the operation of the fluid supply valves for the fluid cylinder devices, said sensor lock device being automatically released upon the actuation of the fluid cylinder device to collapse the toggle links and open the ball grips and the sensor device being thereby returned to its ball engaging position.

5. The combination as defined in claim 1 and said sensor device having a spring biasing means lying therewithin to normally urge the sensor device rearwardly, said ball head having a receptacle opening, an electrical plug spring biased within the sensor device for thrusting the plug from the sensor device into the ball receptacle opening, means operable in response to the movement of the power means for the releasing of the ball grip clamps to retract the electric plug.

6. The combination as defined in claim 5, and said electric plug means having a cable extending through the sensor device for controlling the operation of the plug device, said operable means including means connecting the cable with the power means for opening and closing said ball grip clamps, whereby the retraction of the plug means is effected by the cable.

7. The combination as defined in claim 6 and said retractable ball mechanism in the trailer vehicle including a ball head shank with extension with an opening, a cable extending rearwardly from the receptacle opening in the ball head through the ball shank and its extension, a cable spool carried on the ball grip mechanism, said cable spool including spring means for effecting the reeling and unreeling of the cable from the ball shank as the ball is retracted and extended.

8. The combination as defined in claim 1, said retractable ball head mechanism having a housing and power operated means in said housing for extending and retracting the ball head, said power means including a dampener assembly to permit retraction of the ball head upon the same encountering a wall obstruction.

9. The combination as defined in claim 8, said power means having a threaded ball shank extension extending through the dampener assembly, reversible motor driven gearing carried on said dampener assembly and operable upon the threaded ball shank extension to extend and retract the ball head and compression spring means reacting against the housing for normally holding the dampener assembly in its advanced position.

10. The combination as defined in claim 9, and limit switch means in the housing engageable by abnormal retraction of the ball head and dampener assembly to effect the reversing of the motor driven gearing and the retraction of the ball head and into extension upon the dampener assembly.

* * * * *